United States Patent
Hashimoto et al.

(10) Patent No.: US 11,654,369 B2
(45) Date of Patent: *May 23, 2023

(54) GAME SYSTEM, GAME METHOD, AND GAME PROGRAM

(71) Applicant: The Pokemon Company, Tokyo (JP)

(72) Inventors: Takuya Hashimoto, Tokyo (JP); Satoki Nakamura, Tokyo (JP)

(73) Assignee: THE POKEMON COMPANY, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/581,988

(22) Filed: Jan. 24, 2022

(65) Prior Publication Data

US 2022/0143512 A1 May 12, 2022

Related U.S. Application Data

(63) Continuation of application No. 16/908,787, filed on Jun. 23, 2020, now Pat. No. 11,278,814.

(30) Foreign Application Priority Data

Jun. 24, 2019 (JP) ............................. JP2019-116538
Jan. 9, 2020 (JP) ............................. JP2020-001836

(51) Int. Cl.
  A63F 13/77 (2014.01)
  A63F 13/798 (2014.01)
  A63F 13/335 (2014.01)
  A63F 13/323 (2014.01)

(52) U.S. Cl.
  CPC ............ *A63F 13/77* (2014.09); *A63F 13/323* (2014.09); *A63F 13/335* (2014.09); *A63F 13/798* (2014.09); *A63F 2300/552* (2013.01); *A63F 2300/558* (2013.01)

(58) Field of Classification Search
  CPC .................................................. A63F 13/323
  See application file for complete search history.

(56) References Cited

U.S. PATENT DOCUMENTS

| | | | |
|---|---|---|---|
| 2006/0136964 | A1 | 6/2006 | Diez et al. |
| 2013/0045803 | A1 | 2/2013 | Kang et al. |
| 2015/0011277 | A1 | 1/2015 | Wakeford et al. |
| 2016/0139773 | A1 | 5/2016 | Kodisoja et al. |

(Continued)

FOREIGN PATENT DOCUMENTS

| | | |
|---|---|---|
| JP | 2015-173783 A | 10/2015 |
| JP | 6393846 B1 | 9/2018 |

OTHER PUBLICATIONS

Office Action issued Sep. 20, 2022 in Japanese Patent Application No. 2019-217233, 10 pages.

*Primary Examiner* — Jay Trent Liddle
(74) *Attorney, Agent, or Firm* — Xsensus LLP

(57) ABSTRACT

A game system, a game method, and a game program, which allow the user to enjoy a game with peace of mind even if a bias is provided in predetermined parameters. The game system is configured to acquire, as available environment information indicating an available environment for a game to be executed on a user terminal used by the user, information indicating a type of an operating system (OS); and determine a parameter to be used to provide a content to the user each time the user performs an input operation on the basis of the information indicating the type of the OS associated with the user at the time of the input operation.

18 Claims, 11 Drawing Sheets

(56) References Cited

U.S. PATENT DOCUMENTS

2018/0071630 A1  3/2018  Wakeford et al.
2018/0093179 A1  4/2018  Gregory et al.
2018/0318714 A1  11/2018  Wakeford et al.
2018/0345140 A1  12/2018  Posin

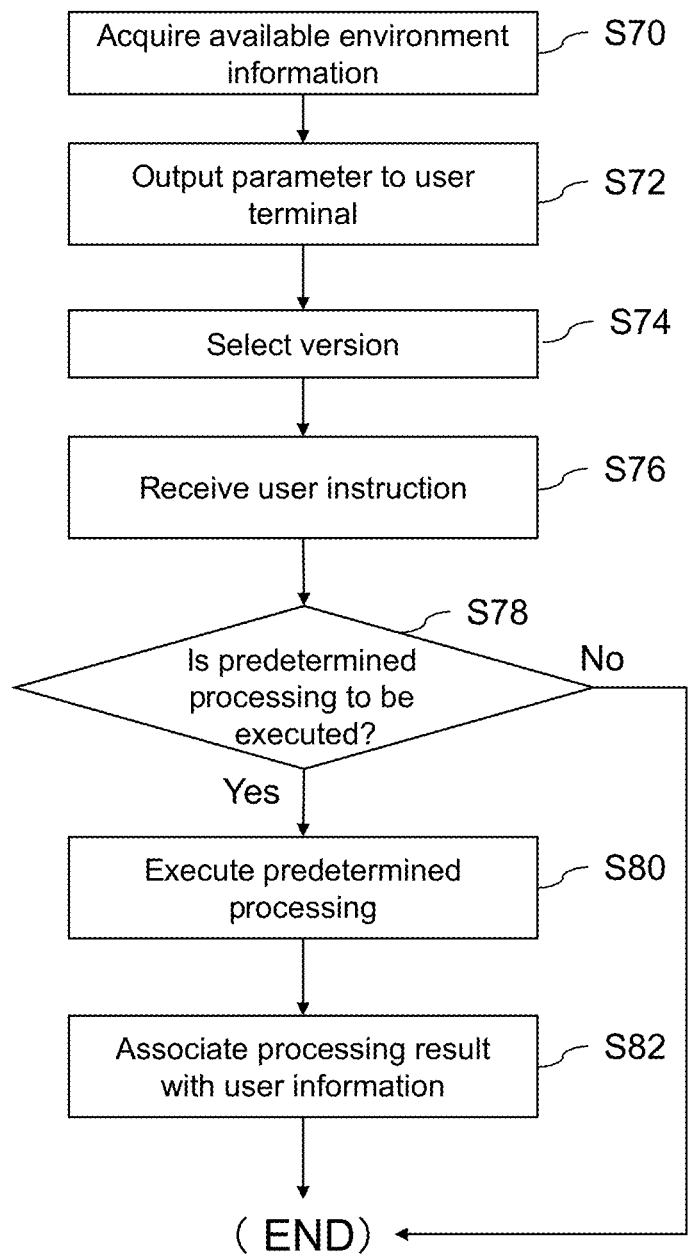

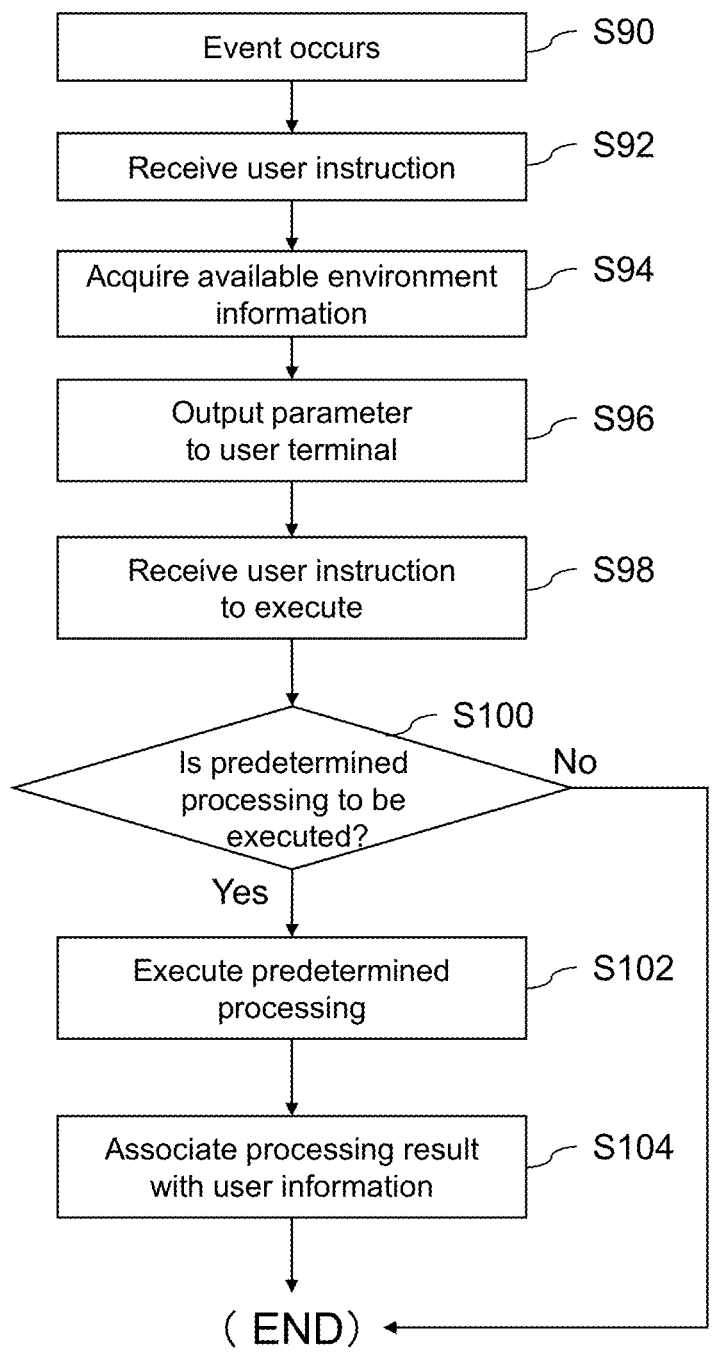

GAME SYSTEM, GAME METHOD, AND GAME PROGRAM

CROSS-REFERENCE TO RELATED APPLICATIONS

The present application is a continuation of U.S. application Ser. No. 16/908,787, filed Jun. 23, 2020, which claims priority to JP 2019-116538, filed Jun. 24, 2019, and JP 2020-001836, filed Jan. 9, 2020, the entire contents of each are incorporated herein by reference.

BACKGROUND

1. Field of the Disclosure

The present disclosure relates to a game system, a game method, and a game program. In particular, the present disclosure relates to a game system, a game method, and a game program using an available environment for a game.

2. Description of the Related Art

There has been known a server system that is communicatively connected to a terminal device with which a user plays a game, and awards to the user an item selected from a predetermined number of candidate items when a user's game progress satisfies a specific item award condition (see Japanese Patent No. 5457146, for example). The server system includes a preferential acquisition item setting unit that sets a first item included in the candidate items as a preferential acquisition item for one user, and sets an item different from the first item included in the candidate items as a preferential acquisition item for another user, a storage unit that stores identification information of the preferential acquisition item for each user, and an appearance rate of the preferential acquisition item set higher than an appearance rate of a non-preferential acquisition item, and an awarded item selection unit that selects an item to be awarded to each user from the candidate items using an appearance rate. In the server system disclosed in Japanese Patent No. 5457146, each user can acquire an item selected uniquely for the user.

SUMMARY

The server system disclosed in Japanese Patent No. 5457146 can provide a bias in the types of items to be awarded to each user by setting a preferential acquisition item for each user. However, changing the appearance probability of an item for each user in a social game or the like due to a factor not to be freely selected by the user may cause a user who does not know the internal configuration of the system to suspect that either a game administrator controlled the probability inappropriately in spite of not doing such control or that the probability is controllable inappropriately. Such a suspicion raised makes it impossible for the user to enjoy the game with peace of mind. On the other hand, if providing a bias in parameters such as the probability is possible, it creates an expectation of improvement in playability and entertainment.

Therefore, one object of the present disclosure is to provide a game system, a game method, and a game program, which allow the user to enjoy a game with peace of mind even if a bias is provided in predetermined parameters.

In order to achieve the above object, the present disclosure is a game system capable of providing predetermined content to a user. The game system includes a communication interface configured to acquire, as available environment information indicating an available environment for a game to be executed on a user terminal used by the user, information indicating a type of an operating system (OS); and processing circuitry configured to determine a parameter to be used to provide a content to the user each time the user performs an input operation on the basis of the information indicating the type of the OS associated with the user at the time of the input operation.

Further, in order to achieve the above object, the present disclosure is a game method for a game system capable of providing a predetermined content to a user. The game method includes acquiring, as available environment information indicating an available environment for a game to be executed on a user terminal used by the user, information indicating a type of an operating system (OS); and determining a parameter to be used to provide a content to the user each time the user performs an input operation on the basis of the information indicating the type of the OS associated with the user at the time of the input operation.

Further, in order to achieve the above object, the present disclosure is one or more non-transitory computer-readable media including a game program for a game system capable of providing a predetermined content to a user. The game program causes a computer to implement an available environment information acquisition function of acquiring, as available environment information indicating an available environment for a game to be executed on a user terminal used by the user, information indicating a type of an operating system (OS); and a parameter determination function of determining a parameter to be used to provide a content to the user each time the user performs an input operation on the basis of the information indicating the type of the OS associated with the user at the time of the input operation.

Further, in order to achieve the above object, the present disclosure is an information processing device for a game system capable of providing a predetermined content to a user. The information processing device includes a communication interface configured to acquire, as available environment information indicating an available environment for a game to be executed on a user terminal used by the user, information indicating a type of an operating system (OS); and processing circuitry configured to determine a parameter to be used to provide a content to the user each time the user performs an input operation on the basis of the information indicating the type of the OS associated with the user at the time of the input operation.

According to the present disclosure, it is possible to provide a game system, a game method, and a game program, which allow the user to enjoy a game with peace of mind even if a bias is provided in predetermined parameters.

BRIEF DESCRIPTION OF THE DRAWINGS

FIG. 10 is a flowchart of processing in the game system according to the embodiment; and FIG. 11 is a flowchart of processing in the game system according to the embodiment

DESCRIPTION OF THE PREFERRED EMBODIMENTS

Embodiment

Figure 1:
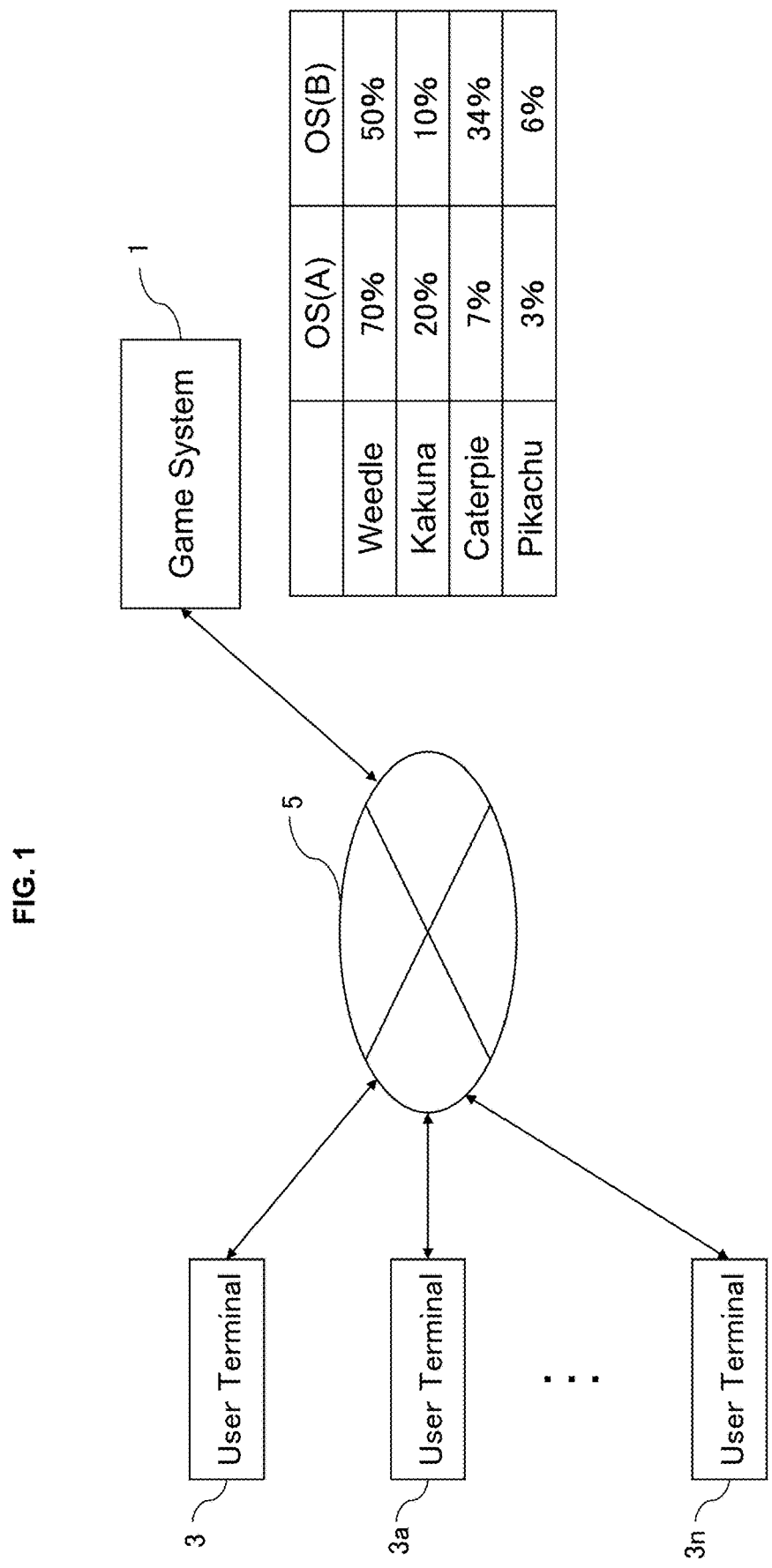
FIG. 1 is a schematic diagram of a game system according to an embodiment.

FIG. 1 illustrates an outline of a game system according to an embodiment of the present disclosure.

Outline of Game System 1

A game system 1 according to the present embodiment is a system that can determine a parameter of content to be used in a game on the basis of information unique to a device and/or software used by a user for executing the game, that is, available environment information indicating an available environment for the game. Specifically, the game system 1 acquires the available environment information from the device and/or software used by the user for executing the game, and executes the game using the parameter associated with the available environment information and the content. Note that the game system 1 and user terminals (e.g., a user terminal 3, a user terminal 3a, . . . , and a user terminal 3n) owned by users are connected via a communication network 5 so as to be capable of two-way communication. Further, the game system 1 may be a server-client type game system.

Figure 2:
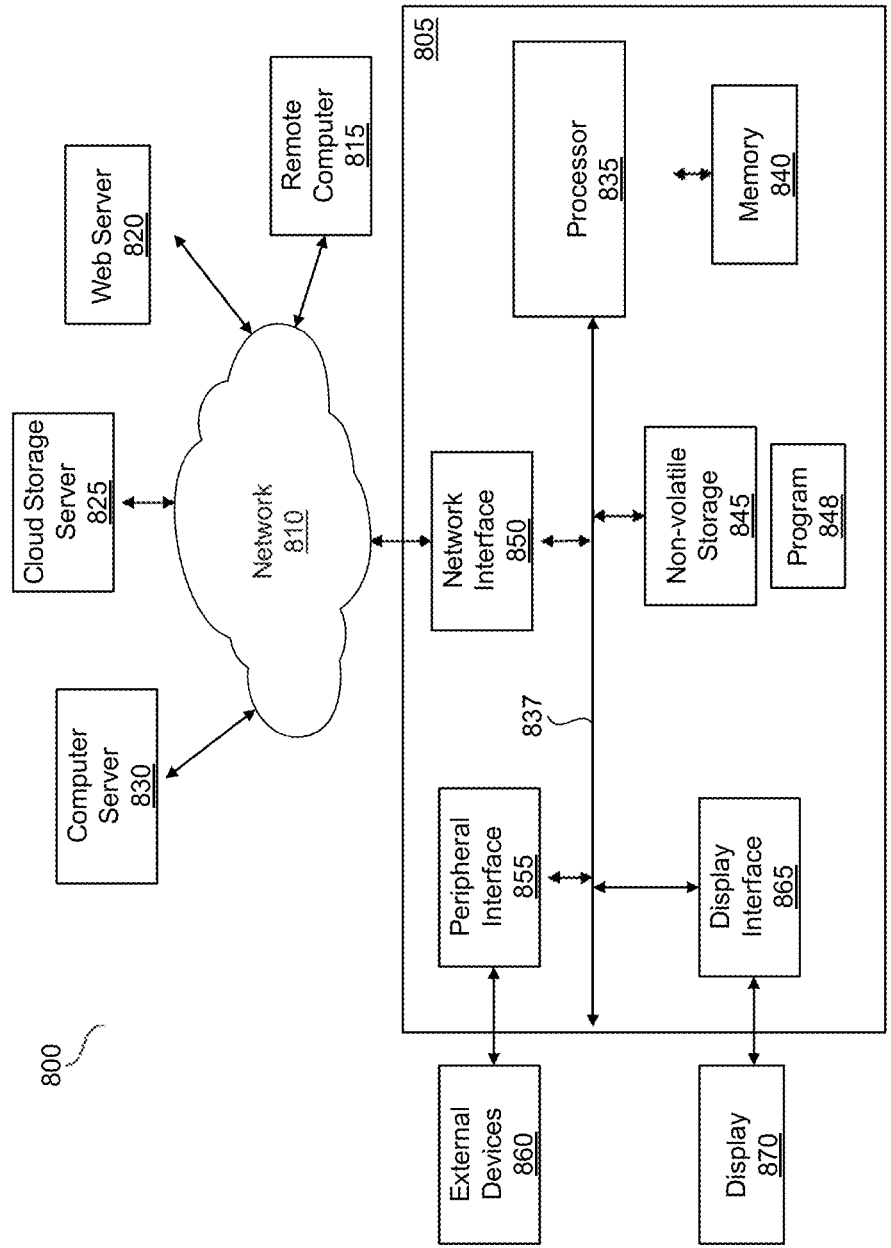
FIG. 2 is a block diagram of a computer-based system on which embodiments of the present system may be implemented.

FIG. 2 illustrates a block diagram of a computer that may implement the various embodiments described herein. For example, the user terminals 3a-3n, game system 1 may be implemented as the computer shown in FIG. 2 and described below.

The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 2 is a functional block diagram illustrating a networked system 800 of one or more networked computers and servers. In an embodiment, the hardware and software environment illustrated in FIG. 2 may provide an exemplary platform for implementation of the software and/or methods according to the present disclosure.

Referring to FIG. 2, a networked system 800 may include, but is not limited to, computer 805, network 810, remote computer 815, web server 820, cloud storage server 825 and computer server 830. In some embodiments, multiple instances of one or more of the functional blocks illustrated in FIG. 2 may be employed.

Additional detail of computer 805 is shown in FIG. 2. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

Obviously, numerous modifications and variations of the present invention are possible in light of the above teachings. It is therefore to be understood that within the scope of the appended claims, the invention may be practiced otherwise than as specifically described herein.

The content as used herein refers to characters that are active in the game, items that are used in the game, images and sounds that are used in the game, and the like. As an example, the content is a character that appears in the game. Note that the game as referred to in the present embodiment includes various types of games, and the game also includes a form of providing a predetermined content to the user by a drawing.

Further, the available environment as used herein refers to an environment required for a certain game executed on a certain device (user terminal), and also a user selectable environment defined by information on hardware of the device, information on software, information related to an account for a social network service (SNS), a game service account, and/or other service which is registered with the user. Specifically, the available environment is at least one available environment selected from the group comprising of an operating system (OS) used in the user terminal, an OS version (version of the same OS), a game program, a version of the game program, a browser capable of executing a browser game, a user terminal, a type of user terminal, an account used to log in to the game, a user terminal manufacturer (account for an SNS or a game service), a processor mounted on the user terminal, and the like. Note that the available environment in the present embodiment may be unrelated to, for example, user's daily motions and actions (the number of walks, travel time, physical information, etc.). Further, the available environment in the present embodiment may be unrelated parameters related to the execution of game that changes according to the user's operation in the game (game play time, number of game executions, number of times content drawing is performed in the game, amount of compensation consumed for content drawing described later, etc.).

Further, the parameter as used herein refers to a parameter used in acquiring the content used in the game, appearance of the content in the game, and/or use of the content in the game. The parameter may be a parameter used to select one or more contents from a plurality of contents. For example, the parameter may be a winning probability of the content when the content is provided to the user by a drawing, and/or an appearance probability of the content when the content appears in the game. Also, the parameter may be at least one parameter selected from the group comprising of a nature and/or performance of the content, a degree of enhancement when the nature and/or performance of the content is enhanced, the number of predetermined items required to enhance the nature and/or performance of the content, a degree of difficulty of acquiring the content in the game, and the like.

Note that, in the game system 1, a drawing for contents may be a drawing for providing a predetermined content to the user (as an example, so-called "gacha"), whether it is paid or free, in exchange for consumption of a predetermined compensation (e.g., items such as coins and gems in the game, virtual currency in the game, etc.) according to the user's instruction. Furthermore, the drawing for contents may be a drawing for providing a predetermined content to the user during, before, or after a predetermined event in the game. For example, the drawing for contents may be a drawing for appearance of an enemy character to appear in a predetermined event (as an example, execution of a battle in a game, a puzzle, etc.). Further, the drawing for contents may be a drawing for acquiring a predetermined character (including an enemy character) or an item (e.g., an item whose winning probability varies depending on an event result) to appear in a predetermined event during or after the event.

In the outline example of FIG. 1, an example will be described in which the content is a character appearing in the game, the available environment information indicates a type of an operating system (OS) of the user terminal, and the parameter is a probability (winning probability) that the character can be acquired in a drawing in the game. In FIG. 1, an example will be described in which the game system 1 acquires information indicating a type of OS of the user terminal from the user terminal 3 in response to receiving a drawing instruction for a character from the user terminal 3, and changes a winning probability of the character on the basis of the acquired information indicating the type of OS. Note that the winning probability is a probability of winning the character in a drawing.

First, suppose that the user terminal 3 operates on an operating system (A) (OS (A)), and the user terminals 3a and 3n different from the user terminal 3 operate on an operating system (B) (OS (B)). Then, for example, suppose that a game is executed in the user terminal 3, and a drawing for acquiring a character is performed. In this case, the game system 1 receives a drawing instruction for the character from the user terminal 3. Then, the game system 1 acquires information indicating the type of OS of the user terminal 3 from the user terminal 3 as available environment information. In the example of FIG. 1, the game system 1 acquires information indicating that the OS running on the user terminal 3 is the OS (A).

Here, the game system 1 has memory that stores a winning probability of each character in association with the character and the type of OS. For example, as illustrated in FIG. 1, the memory of the game system 1 stores a winning probability of "70%" as a parameter in association with a character of "WEEDLE" and the OS (A), and also stores a winning probability of "50," in association with a character of "WEEDLE" and the OS (B). Accordingly, when a drawing is performed in the user terminal 3 operating on the OS (A), "WEEDLE" is won with a probability of 70%, and when a drawing is performed in the user terminal 3a or others operating on the OS (B), "WEEDLE" is won with a probability of 50%. In the same way, the memory stores a winning probability in association with each of the other characters (e.g., "KAKUNA", "CATERPIE", and "PIKACHU") and each of the OS (A) and the OS (B). Note that, in the example of FIG. 1, the total of the winning probabilities stored in association with the OS (A) which is one piece of available environment information is 100, and the same applies to the OS (B).

Then, the game system 1 performs a drawing. In the example of FIG. 1, the game system 1 performs a drawing on the basis of the winning probability of a character associated with the OS (A) by referring to the memory. The game system 1 executes processing of providing the won character to the user of the user terminal 3 on the basis of a result of the drawing.

Further, the game system 1 can cause the user terminal 3 to output the winning probability of each character before, during, or after reception of a drawing instruction from the user terminal 3. From the viewpoint of allowing the user to recognize the winning probability, it is preferable to cause the user terminal 3 to output the winning probability before reception of the drawing instruction. Specifically, in a case where the game system 1 performs a drawing using the user terminal 3, the game system 1 causes a display or the like of the user terminal 3 to output the respective drawing probabilities of "WEEDLE", "KAKUNA", "CATERPIE", and "PIKACHU". Further, the game system 1 may cause the display or the like of the user terminal 3 to output the drawing probabilities so that the user can compare the respective drawing probabilities of "WEEDLE", "KAKUNA", "CATERPIE", and "PIKACHU" in the user terminal 3 operating on the OS (A) with the respective drawing probabilities of "WEEDLE", "KAKUNA", "CATERPIE", and "PIKACHU" in the user terminal 3a or others operating on the OS (B). This allows the user to have several choices as to which OS the user terminal operates on to play the game. For example, when playing a game for the first time, the user can select which OS the user terminal operates on to start the game. Further, if terminal takeover processing (model change procedure processing) allows for changing information on the OS on which the user terminal is to operate, the game can be continued using another user terminal operating on an OS different from the currently used OS.

Thus, in the game system 1, the user can perform a drawing after getting to know that, for example, it is more likely for the user using the user terminal 3 to win "WEEDLE" and "KAKUNA" as compared to a case of using the user terminal 3a, and it is more likely for the user using the user terminal 3a to win "CATERPIE" and "PIKACHU" as compared to a case of using the user terminal 3. Therefore, in the game system 1, OS information or the like that cannot be changed by a game administrator is used as an element for determining the parameter. This makes it possible to prevent the user from suspecting that the game administrator controlled the winning probabilities for each user inappropriately. In this way, the game system 1 can provide a bias in parameters without causing a user to suspect that a game administrator controlled a predetermined parameter inappropriately.

Note that, in the game system 1, the timing of performing a drawing is, but not particularly limited, for example, a timing during a predetermined event in the game, a timing after a predetermined event, and/or a timing of providing a predetermined item or character according to a user's instruction in exchange for consumption of points given to the user and the like (i.e., the timing of gacha or purchase). In addition, each drawing may be repeatedly performed each time an event occurs and/or each time the user instructs. In this case, in the game system 1, as described above, for example, the winning probability of each character can be output to the user terminal. Accordingly, as an example, when the user wins "WEEDLE" by a drawing using the user terminal 3 and then owns the user terminal 3a, changing the user terminal 3 in use for the current play to the user terminal 3a by a type change procedure or the like makes it possible to change the winning probabilities of "CATERPIE" and "PIKACHU" (in the above example, to set the winning probabilities to be more than those in the user terminal 3). In other words, the game system 1 can change the winning probabilities on the basis of the intention of the user each time a game event occurs and each time gacha or purchase is performed.

In addition, in a case where the user terminal 3 and the user terminal 3n participate in the same game, the game system 1 may perform a drawing on the basis of the available environment information of the other party in response to an instruction from the user of the user terminal 3 and/or the user of the user terminal 3n. For example, the game system 1 may perform a drawing on the basis of the winning probability of a character associated with the OS (B) of the user terminal 3n according to the instruction from the user of the user terminal 3. In this case, although it is more likely for the user using the user terminal 3n to win "CATERPIE" and "PIKACHU" as compared to using the user terminal 3 in default, the user of the user terminal 3 can perform a drawing with the same winning probabilities as in the case of using the user terminal 3n even when using the user terminal 3. Thus, the game system 1 makes it possible to allow active interaction between users and improve the playability of the game.

Note that the user terminals (e.g., the user terminal 3, the user terminal 3a, . . . , and the user terminal 3n) are information communication terminals such as mobile phones, smartphones, laptop computers, tablet PCs, desktop PCs, and the like. Further, the communication network 5 is a communication network such as a mobile phone network and/or the Internet. The communication network 5 may include a communication network such as a wired LAN or a wireless LAN, and a short-range communication network. In the following, details of the game system 1 according to the present embodiment will be described. However, unique names and numerical values in the above description and the following description are merely examples, and it should be understood that the present disclosure is not limited by such unique names and numerical values, and the unique names and numerical values are not necessarily related to the actual unique names and numerical values.

Details of Game System 1

Figure 3:
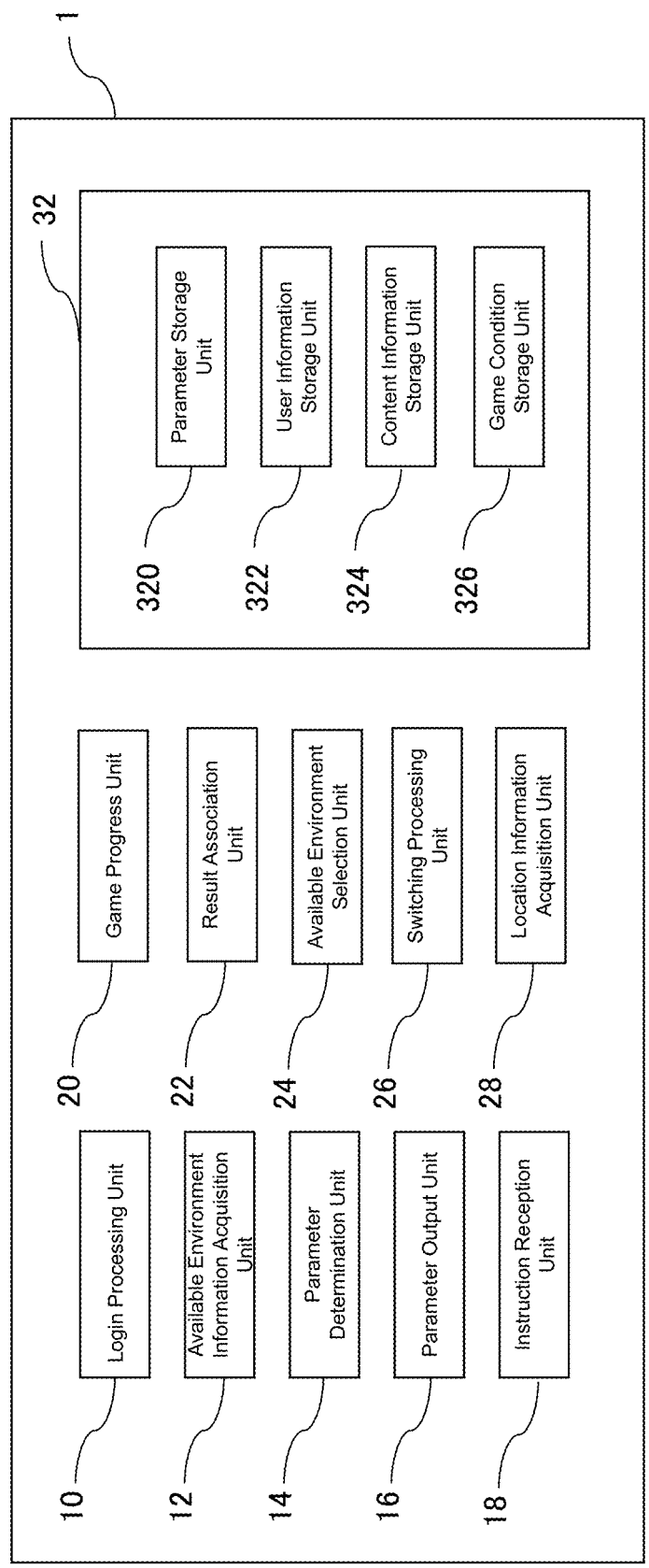
FIG. 3 is a functional block diagram of the game system according to the embodiment.
Figure 4:
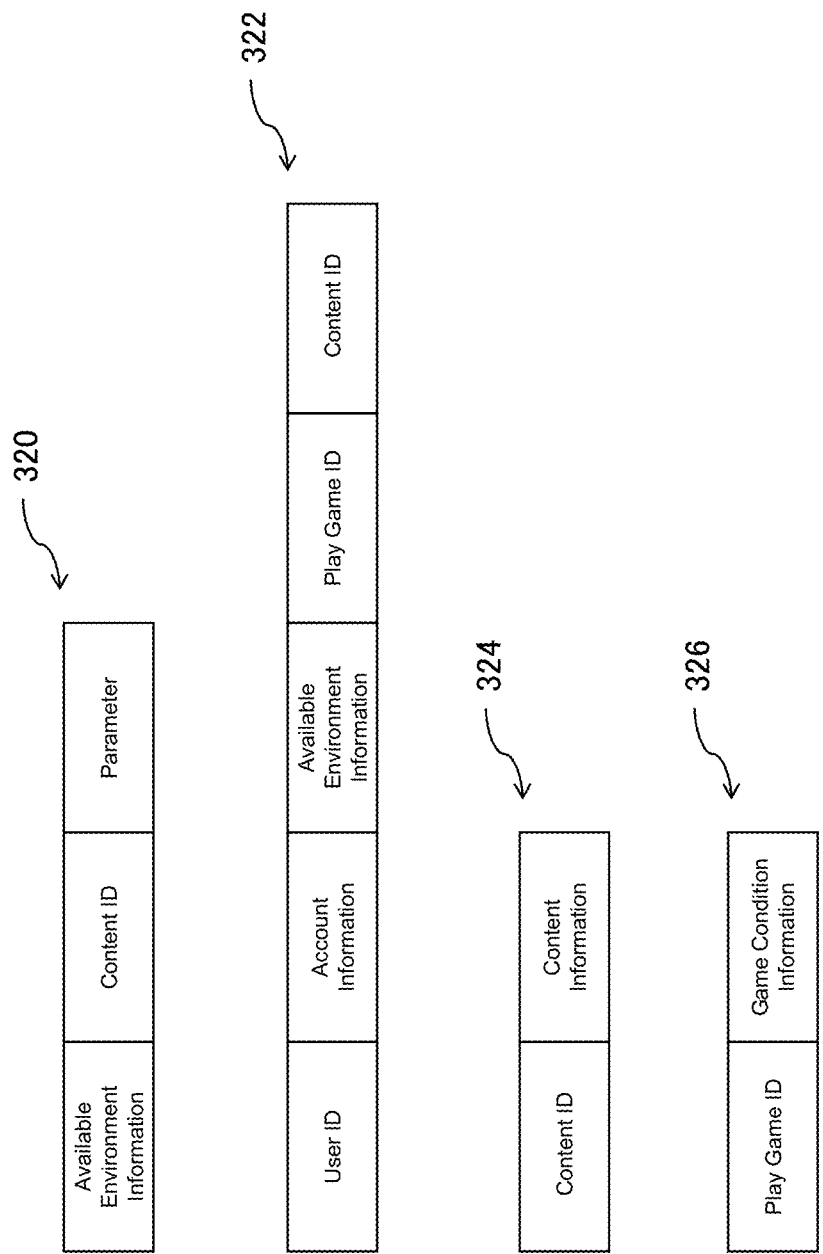
FIG. 4 is a diagram illustrating a data configuration of each storage unit included in an information storage unit according to the embodiment.

FIG. 3 illustrates an example of a functional configuration of the game system according to the present embodiment. FIG. 4 illustrates an example of a data configuration according to the present embodiment.

Outline of Configuration of Game System 1

The game system 1 according to the present embodiment is a game system capable of providing a predetermined content to a user. The game system 1 includes a login processing unit 10 that processes a user logging in to a game, an available environment information acquisition unit 12 that acquires available environment information of a user terminal, a parameter determination unit 14 that determines a parameter, a parameter output unit 16 that outputs the parameter to the user terminal, an instruction reception unit 18 that receives an instruction from the user terminal, a game progress unit 20 that controls a progress of the game, a result association unit 22 that associates a result of the progress of the game with user information of the user, an available environment selection unit 24 that selects an available environment, a switching processing unit 26 that switches the available environment, and a memory 32 that stores various types of information. In addition, the game system 1 may further include a location information acquisition unit 28 that acquires location information of the user terminal.

The various units described above may be implemented by a combination of the hardware and software configuration disclosed above in relation to FIG. 2.

The information storage unit 32 includes a parameter storage unit 320 that stores parameters, a user information storage unit 322 that stores user information, a content information storage unit 324 that stores information related to contents, and a game condition storage unit 326 that stores the progress of the game and the like.

In the game system 1, all the plurality of components may be located at the same physical place, or some of the plurality of components may be installed in a physically remote location. For example, the game system 1 may cause the user terminal or an external server to perform some of the functions of the components. The game system 1 may also be configured as one or more servers. In this case, the game system 1 is configured by combining components of one server with components of another server. Further, in the present embodiment, each device (user terminal, server, etc.) can be understood as an information processing device as described above in relation to FIG. 2. In other words, it can be understood that a collection of the devices is one "information processing device", so that the game system 1 may be formed as a collection of such devices. A method of allocating a plurality of functions required for implementing the game system 1 according to the present embodiment to one or more hardware components may be determined as appropriate in consideration of processing capability of each hardware component and/or a specification required for the game system 1. Further, various types of information stored in the information storage unit 32 may be updated at any time by acquiring user's instructions and information received via the instruction reception unit 18 and/or predetermined information from a predetermined server present outside the game system 1.

Details of Configuration of Game System 1

In the following description, a case will be described as an example where a user mainly plays a game provided by the game system 1 using the user terminal 3 as an example. However, in the game system 1, the user and one or more users different from the user can simultaneously play the game using the user terminal 3 and one or more user terminals different from the user terminal 3, and/or can play in the same event or the same field in the game.

Login Processing Unit 10

The login processing unit 10 executes processing for the user to log in to the game (user authentication). The game according to the present embodiment adopts a specification that allows the user to log in using an account such as an account for a social network service (SNS) and an account for using various types of services on the Internet or the cloud as well as an account for the game. Then, the user can play the game on the user terminal 3 by logging in with at least one or more accounts selected from the group comprising user's own accounts for the game, for an SNS, for various types of services on the Internet or the cloud, and for the like.

For example, the login processing unit 10 acquires user's account information (e.g., a user ID and a password for a predetermined account, or biometric information when biometric authentication is used for login) from the user terminal 3. Then, the login processing unit 10 executes login processing for the user to log in to the game using the acquired account information. The login processing unit 10 executing the login processing allows the game to be executed on the user terminal 3.

Available Environment Information Acquisition Unit 12

The available environment information acquisition unit 12 acquires available environment information indicating an available environment of a game to be executed on the user terminal 3. The available environment information acquisition unit 12 can acquire available environment information at various timings such as when the user terminal 3 downloads a game program for the game system 1, when the game program is started in the user terminal 3 for the first time, when a predetermined sub game (e.g., a drawing to be performed in response to an instruction from the user received by the instruction reception unit 18) or an event is executed in the game, when an instruction to acquire available environment 2'7 information is received from the user in the game, or every time the game is started in the user terminal 3.

For example, when the available environment is an OS, the available environment information acquisition unit 12 can acquire information indicating the type of the OS as the available environment information. Here, the information indicating the type of the OS may be any information as long as it can identify the OS required to execute the game on the user terminal 3. For example, the information indicating the type of the OS includes information on the OS itself (e.g., OS name, OS version information, and OS edition information), OS information (e.g., OS name, OS version information, and OS edition information) specified from various types of information stored in the user terminal 3, OS information specified from OS version information, OS information specified from the performance of the user terminal 3 (e.g., information specified on the basis of whether the user terminal 3 has a predetermined function, or information specified from a result of executing certain processing, i.e., information such that the user terminal 3 having a function executable in a certain OS is identified as including that OS), OS information specified from information on a download source (e.g., a store) when the user terminal 3 downloads a game program for the game system 1, and OS information specified from information registered by a user at a certain site or the like outside the user terminal 3.

The available environment information acquisition unit 12 may also inquire of the user terminal 3 in response to receiving from the login processing unit 10 login information indicating that the user has logged in with a predetermined account on the user terminal 3, in order to acquire the available environment information of the user terminal 3. Further, when the available environment is a predetermined account and the available environment information is account information of the user, the available environment information acquisition unit 12 may inquire of the user terminal 3 and/or a service server that provides the account, in order to acquire the available environment information. The available environment information acquisition unit 12 supplies the available environment information in the user terminal 3 to the parameter determination unit 14.

Information Storage Unit 32, Parameter Storage Unit 320, User Information Storage Unit 322, Content Information Storage Unit 324, Game Condition Storage Unit 326

The information storage unit 32 includes a plurality of storage units for storing predetermined information. The information storage unit 32 supplies predetermined information to each component according to an action of each component included in the game system 1.

The parameter storage unit 320 stores parameters of contents. Specifically, the parameter storage unit 320 stores the parameters in association with pieces of available environment information and content IDs of the contents. A content ID is an identifier for uniquely identifying a content. Further, a parameter is, for example, a numerical value, and the parameter storage unit 320 can store the parameter so that it can be used for a predetermined calculation.

Here, if the pieces of available environment information are enormous like pieces of information indicating the respective types of user terminals, it may be difficult to store parameters corresponding to all types of the available environment information. Therefore, if it is expected that the number of pieces of available environment information different from each other is extremely large, the parameter storage unit 320 stores the parameters in association with the pieces of available environment information whose number is in the range of one to a quantity easily recognizable to the user and the content IDs. In other words, the parameter storage unit 320 classifies available environment information into specific available environment information and other available environment information except for the specific available environment information, and then stores the parameters. For example, if the available environment information indicates types of user terminals, the parameter storage unit 320 may store the parameters in association with pieces of information indicating the respective types of the first user terminal, the second user terminal, and the third user terminal, pieces of information indicating the respective types of the other user terminals, and the content IDs.

On the other hand, if there is a plurality of pieces of available environment information but specifying one piece of available environment information results in uniquely specifying a piece of available environment information, a specific parameter may be used only for the specific piece of available environment information. For example, if there are only two types of available environment information, specifying one of the types of available environment information results in automatically specifying the other type of available environment information. In this case, the parameter storage unit 320 may store a parameter in association with one type of available environment information and a content ID.

The parameter storage unit 320 may also be a collection of a plurality of parameter tables that store the parameters in association with the pieces of available environment information and the content IDs. For example, n parameter tables for the available environment information (where n is an integer of 2 or more) may be provided, and the parameter storage unit 320 may include the parameter tables. As an example, if the available environment information indicates types of user terminals, the parameter storage unit 320 may be configured to store parameter tables for specific types of user terminals and a parameter table for other types of user terminals except the specific types, for example, a parameter table for a first type of user terminal, a parameter table for a second type of user terminal, and a parameter table for other types of user terminals except the first type and the second type.

The user information storage unit 322 stores information related to users in association with user IDs for identifying the users. Specifically, the user information storage unit 322 stores, in association with a user ID serving as a piece of user information, one or more pieces of account information of each user (account user ID, password, and the like), the available environment information of the user terminal 3 (information indicating the type of OS of the user terminal 3, information related to a browser used in the user terminal 3, information related to the type of terminal of the user terminal 3, etc.), a play game ID for uniquely identifying a game being played or scheduled to be played by the user, a content ID (e.g., a character ID for the content being a character, an item ID for the content being an item) for uniquely identifying a content (e.g., a character or an item appearing in the game) held by the user, an image ID for uniquely identifying an image such as an avatar of the user in the game, and/or other information (personal information, etc.).

The content information storage unit 324 stores pieces of content information, which are pieces of information related to contents, in association with content IDs. For example, if the content is a character appearing in the game, the content information includes information such as information indicating the name of the character, information indicating the level of the character, information indicating the gender of the character, information indicating the status of the character, information indicating the features and abilities of the character, information indicating the powers of the character, image information of the character, the number of predetermined items required to enhance or change the abilities of the character, and the like. In this case, the content ID is a character ID. Further, if the content is an item used in the game, the content information includes information such as information indicating the name of the item, information indicating the features and abilities of the item, image information of the item, and the like. In this case, the content ID is an item ID.

The game condition storage unit 326 stores pieces of information (game condition information) related to game conditions including the progress of the game of the user. The game condition storage unit 326 stores a piece of game condition information in association with a play game ID. The game condition storage unit 326 stores each piece of game condition information in association with the date information and time information such as the date and time when the user logged in, the date and time when the user interrupted the game, and the date and time when the user logged out.

Parameter Determination Unit 14

The parameter determination unit 14 determines a parameter associated with a content used in the game on the basis of the available environment information acquired by the available environment information acquisition unit 12. The parameter determination unit 14 can determine a parameter in response to a user's input operation, which may be a single operation or a plurality of operations, or each time the user's input operation is performed. Specifically, the parameter determination unit 14 can refer to the parameter storage unit 320 and use a parameter stored in the parameter storage unit 320 in association with the acquired available environment information as the parameter to be determined. For example, in the parameter storage unit 320, one or more content IDs are stored in association with one piece of available environment information, and a parameter is associated with each of the one or more content IDs. The parameter determination unit 14 determines one or more parameters stored in the parameter storage unit 320 in association with the acquired one piece of available environment information as parameters to be used in the game.

As an example, suppose that the available environment is types of user terminals, the content is a character, and the parameter is an appearance probability of the character in the game. In this case, the parameter storage unit 320 stores a character ID for identifying the character and the appearance probability in association with each of the pieces of available environment information indicating the types of user terminals. Then, the parameter determination unit 14 determines, as a parameter to be used in the game, the appearance probability stored in the parameter storage unit 320 in association with the piece of available environment information indicating the type of the user terminal corresponding to the acquired available environment information. For example, the parameter determination unit 14 determines, as a parameter to be used in the game, an appearance probability associated with each of a plurality of character IDs stored in the parameter storage unit 320 in association with one piece of available environment information.

Further, for example, suppose that the available environment is types of OSs of user terminals, the content is a character, and the parameter is a probability of winning the character in a drawing in the game. In this case, the parameter storage unit 320 stores a character ID and the probability of winning the character of the character ID in association with each of the pieces of available environment information indicating the respective types of OSs. Then, the parameter determination unit 14 determines, as a parameter to be used in the game, the probability stored in the parameter storage unit 320 in association with the piece of available environment information indicating the type of the OS corresponding to the acquired available environment information.

Further, for example, suppose that the available environment is types of OSs of user terminals, the content is a character, and the parameter is the number of items required to acquire the character and/or change the abilities in the game. Note that the abilities include, for example, the character's properties, powers (attack power, defense power, vital spirit, etc.), and evolved forms (e.g., "evolution" means that a certain character changes into a character with an evolved form as a trigger such as use of a predetermined number of items or acquisition of experience points). In this case, the parameter storage unit 320 stores a character ID and the number of predetermined items required to acquire the character of the character ID and/or change the abilities in association with each of the pieces of available environment information indicating the respective types of OSs. Then, for example, when the instruction reception unit 18 receives from the user terminal 3 an instruction to acquire a certain character and/or change the abilities, the parameter determination unit 14 determines, as a parameter to be used in the game, the number of predetermined items stored in the parameter storage unit 320 in association with the available environment information acquired by the available environment information acquisition unit 12.

Note that, in a case where a character is provided to the user by a drawing in the game, various methods can be adopted as a drawing method. For example, a drawing method called Box gacha may be adopted. The Box gacha method is a drawing method in which, for example, a virtual drawing box is provided in a game, a predetermined number of predetermined types of characters and items are set in the drawing box, the user pulls a character or item from the drawing box to perform a drawing, and then the next drawing processing is executed without returning the pulled character or item to the drawing box. When the item to be provided to the user is determined by the drawing processing, the user can hold the item. In this case, the parameter storage unit 320 may store, as a parameter, information for identifying a drawing box to be used for the Box gacha in association with the available environment information. The parameter determination unit 14 can determine, as a parameter to be used in the game, the information for identifying the drawing box stored in the parameter storage unit 320 in association with the piece of available environment information indicating the type of the OS corresponding to the acquired available environment information. Note that, in this case, the content information storage unit 324 stores information on items, serving as content information, included in a drawing box identified by a drawing box ID in association with the drawing box ID (information for identifying the drawing box) serving as a content ID. Further, information on the types and quantity of characters and items to be put in the drawing box used for the box gacha may be stored as parameters.

Further, the parameter determination unit 14 may use a parameter stored in the parameter storage unit 320 as an initial parameter, and use a parameter acquired by changing the initial parameter on the basis of the available environment information as a parameter to be determined. Specifically, the parameter determination unit 14 may use, as a parameter to be determined, a calculated parameter calculated using the parameter stored in the parameter storage unit 320 in association with the available environment information and the content ID, and a coefficient or function determined on the basis of the available environment information. In this case, the parameter determination unit 14 may include a coefficient table or function table that stores a predetermined coefficient or a predetermined function in association with the available environment information. As an example, the parameter determination unit 14 may use, as the calculated parameter, either a value obtained by multiplying the parameter stored in the parameter storage unit 320 in association with the acquired available environment information by a coefficient stored in the coefficient table in association with the available environment information, or a value acquired for the parameter stored in the parameter storage unit 320 in association with the acquired available environment information by using a function stored in the function table in association with the available environment information.

Further, the parameter determination unit 14 may determine the parameter on the basis of use of in-game currency and/or a predetermined item. For example, the parameter determination unit 14 may increase or decrease or change the parameters stored in the parameter storage unit 320 on the basis of use of in-game currency and/or a predetermined item.

Further, the parameter determination unit 14 may switch a parameter set in the available environment information of the user terminal 3 to a parameter set in the available environment information of another user terminal used by another user, by using in-game virtual currency and/or a predetermined item in response to an instruction from the user received by the instruction reception unit 18. For example, if the available environment information indicates types of OSs, in principle, a user terminal operating on a first OS uses, as a parameter for the game in the user terminal, the parameter stored in the parameter storage unit 320 in association with the available environment information indicating the first OS. However, on the assumption that the in-game virtual currency and/or the predetermined item is used, the parameter determination unit 14 may switch the parameter stored in the parameter storage unit 320 in association with the available environment information indicating the first OS to the parameter stored in the parameter storage unit 320 in association with the available environment information indicating a type of OS different from the first OS (e.g., a second OS) (parameter switching processing). Here, the parameter determination unit 14 may be configured to be able to continue the parameter switching processing only during a period of time determined depending on the amount of in-game virtual currency and/or a period of time determined by a predetermined item.

Further, when determining a parameter associated with a content used in the game on the basis of the available environment information acquired by the available environment information acquisition unit 12, the parameter determination unit 14 may use the determined parameter within a predetermined period, and use another parameter outside the period. For example, the parameter determination unit 14 may be configured to use a parameter that is stored in the parameter storage unit 320 only during a specific period (e.g., a predetermined event) sectioned in the game so as to execute the game.

Further, the game system 1 may include a flag association unit that associates, when the user clears the game and/or clears a predetermined event in the game, a flag indicating that the game has been cleared and/or a flag indicating that the event has been cleared with the user ID. In this case, when the user has executed the game again and the flag indicating that the game has been cleared and/or the flag indicating that the predetermined event in the game has been cleared is associated with the user ID, the parameter determination unit 14 may determine, as a parameter to be used in the game, a parameter stored in the parameter storage unit 320 in association with available environment information of an available environment different from the available environment of the user terminal 3 used by the user for executing the game. Note that, when the instruction reception unit 18 receives a predetermined instruction from the user, the parameter determination unit 14 may be configured to use the parameter stored in the parameter storage unit 320 in association with the available environment information of the available environment different from the available environment of the user terminal 3.

Parameter Output Unit 16

The parameter output unit 16 outputs information related to the parameter to the user terminal 3. Specifically, the parameter output unit 16 causes the user terminal 3 to output the parameter determined by the parameter determination unit 14 so as to be perceptible to the user. Further, it is preferable that the parameter output unit 16 causes the user terminal 3 to output the parameter before predetermined processing (e.g., content drawing processing, and content appearance processing in the game) in the game progress unit 20.

For example, the user terminal 3 displays the parameter received from the parameter output unit 16 on the display of the user terminal 3. In this case, the parameter output unit 16 can output a parameter for an available environment different from that of the user terminal 3 together with the parameter determined by the parameter determination unit 14. Specifically, the parameter output unit 16 outputs to the user terminal 3 information related to the parameter for the available environment information of the available environment of the user terminal 3, and information related to a parameter for comparative available environment information indicating an available environment to be compared with the available environment.

As an example, a case will be described where a predetermined content is provided to the user by a drawing in a game. Here, suppose that the available environment is types of OSs, and the parameter is a winning probability of a content. In this case, the parameter storage unit 320 stores a content ID and a winning probability in association with each of the pieces of information indicating the respective types of OSs. Then, the parameter determination unit 14 acquires information indicating the type of OS from the user terminal 3, and acquires a content ID and a winning probability using the information indicating the type of OS, which is the acquired available environment information, as a key. The parameter determination unit 14 determines the acquired winning probability as a winning probability to be used in the game executed on the user terminal 3.

Subsequently, the parameter output unit 16 supplies to the user terminal 3 information related to the winning probability determined by the parameter determination unit 14 and a content to be won with that winning probability, and information related to a winning probability not determined by the parameter determination unit 14 and a content to be won with that winning probability. The user terminal 3 displays, for example on the display, along with the type of OS running in the user terminal 3, a plurality of contents that can be acquired in a drawing in the game on the OS and the winning probabilities of the respective contents, and a plurality of contents that can be acquired in a drawing in the game on other OS except for that OS and the winning probabilities of the respective contents, so that the user can confirm them. Thus, the user can clearly know that the winning probabilities are different in different environments before the execution of the drawing. Accordingly, the game system 1 makes it possible to give the user an opportunity to select a different environment.

Instruction Reception Unit 18

The instruction reception unit 18 receives a user instruction from the user terminal 3. The instruction reception unit 18 receives various types of instructions related to the progress of the game via the user terminal 3. For example, the instruction reception unit 18 receives, from the user terminal 3, an instruction indicating that the game is to be continued using the parameter determined by the parameter determination unit 14 or not to be continued, or an instruction to change the available environment for the game. The instruction reception unit 18 supplies the received instruction to the game progress unit 20, the switching processing unit 26, and the like.

Game Progress Unit 20

The game progress unit 20 controls the progress of the game on the user terminal 3. Specifically, the game progress unit 20 makes progress of the game using the parameter determined by the parameter determination unit 14 on the basis of the available environment information. Further, suppose that a game is executed in which, as the available environment information, a piece of information indicating a type of a first OS and a piece of information indicating a type of the second OS that is different from the type of the first OS can be acquired, and a content to be provided to the user is determined. In this case, when the available environment information acquisition unit 12 acquires the piece of information indicating the type of the first OS, the parameter determination unit 14 determines a first parameter, and when the available environment information acquisition unit 12 acquires the piece of information indicating the type of the second OS, the parameter determination unit 14 determines a second parameter. Then, the game progress unit 20 determines a content to be provided to the user using the first parameter or the second parameter determined by the parameter determination unit 14.

As an example, if the parameter is a winning probability of a content, the game progress unit 20 executes content drawing processing. Further, if the parameter is an appearance probability of a content in the game, the game progress unit 20 executes processing of causing the content to appear in the game on the basis of the appearance probability. Further, if the parameter is a probability that a predetermined result is generated in response to a user operation in the game, the game progress unit 20 executes processing of generating the predetermined result on the basis of the probability. The probability of generating the predetermined result may be, for example, a probability of use of a technique to be executed by one character when characters battle each other in the game.

Further, the game progress unit 20 may make progress of the game on the basis of the instruction received by the instruction reception unit 18. Specifically, the game progress unit 20 makes progress of the game in response to an instruction from the user who refers to the content that the parameter output unit 16 causes the user terminal 3 to output. For example, a case will be described where a predetermined content is to be provided to the user by a drawing in the game, the available environment information indicates types of OSs, and the parameter is a winning probability of a content.

In this case, the parameter output unit 16 causes the display of the user terminal 3 to display, along with the type of OS running in the user terminal 3, a plurality of contents that can be acquired in a drawing in the game and the winning probabilities of the respective contents, and a plurality of contents that can be acquired in a drawing in the game on other OS except for that OS and the winning probabilities of the respective contents. Then, the instruction reception unit 18 receives an instruction as to whether or not the user performs a drawing. When the instruction reception unit 18 receives an instruction to perform a drawing, the game progress unit 20 executes drawing processing. On the other hand, when the instruction reception unit 18 receives an instruction not to perform a drawing, the game progress unit 20 does not execute the drawing processing.

Result Association Unit 22

The result association unit 22 associates a result of the game progress unit 20 making progress of the game with the user information of the user. Specifically, the result association unit 22 receives the result of game progress from the game progress unit 20, and stores information indicating the result of game progress in the user information storage unit 322. For example, the result association unit 22 associates information including the progress of the game as game condition information with the play game ID in the game condition storage unit 326, and also associates the play game ID with the user ID in the user information storage unit 322.

As an example, if the result of game progress is a result of drawing a character appearing in the game, the result association unit 22 associates the character ID, which is the content ID of the won character, with the user ID according to the result of drawing in the user information storage unit 322. Further, the result association unit 22 can also supply the result of game progress to the user terminal 3. The result association unit 22 can cause the user terminal 3 to output the result of game progress so as to be perceptible to the user, and/or to store the result in the storage unit of the user terminal 3.

Available Environment Selection Unit 24

When the game is executed on one user terminal used by one user and another user terminal used by another user, the available environment selection unit 24 allows the one user terminal to select the available environment information of the other user terminal, and also allows the other user terminal to select the available environment information of the one user terminal. Note that the game executed on the one user terminal and the other user terminal is, for example, a game executed on a server of the game system 1. In addition, the user of the one user terminal and the user of the other user terminal are logged in to the game executed on the server during a same period of time.

For example, the available environment selection unit 24 acquires from the login processing unit 10 information indicating that user terminals of a plurality of users who are simultaneously playing a certain game and/or user terminals of a plurality of users who are simultaneously playing a certain stage of a certain game and the like have logged in. Then, the available environment selection unit 24 inquires of each of the plurality of user terminals as to whether or not to use a parameter associated with the available environment information of the available environment of any other user terminal instead of the available environment of the user terminal itself. Next, the available environment selection unit 24 receives a selection instruction from each user terminal as to whether to select its own available environment or to select another user's available environment. Subsequently, the available environment selection unit 24 supplies information on the received instruction to the available environment information acquisition unit 12. The available environment information acquisition unit 12 acquires the available environment information of one user terminal of one user or the available environment information of the other user terminal, which is selected by the available environment selection unit 24 according to the one user's selection, as available environment information for the one user terminal. Note that, when receiving an instruction not to use a parameter associated with the available environment information of another user terminal as the one user's selection, the available environment information acquisition unit 12 acquires the available environment information of the one user terminal.

For example, suppose that a first user participates in a certain game via a first user terminal, and a second user also participates in the same game via a second user terminal. In addition, suppose that the first user terminal uses the OS (A), and the second user terminal uses the OS (B). In this case, in principle, a parameter associated with the OS (A) as the available environment information is applied to the first user terminal, and a parameter associated with the OS (B) as the available environment information is applied to the second user terminal.

Here, when receiving from the login processing unit 10 information indicating that the first user terminal and the second user terminal are simultaneously executing the certain game, the available environment selection unit 24 inquires of the first user terminal as to whether to use the parameter associated with the OS (B) of the second user terminal. Further, the available environment selection unit 24 inquires of the second user terminal as to whether to use the parameter associated with the OS (A) of the first user terminal. When receiving an instruction to use the parameter associated with the OS (B) of the second user terminal from the first user terminal via the instruction reception unit 18, the available environment selection unit 24 supplies that instruction to the available environment information acquisition unit 12. Then, in response to that instruction, the available environment information acquisition unit 12 acquires the parameter associated with the OS (B) as a parameter to be used for the first user terminal. On the other hand, when receiving an instruction to use the parameter associated with the OS (A) of the first user terminal from the second user terminal via the instruction reception unit 18, the available environment selection unit 24 supplies that instruction to the available environment information acquisition unit 12. Then, in response to that instruction, the available environment information acquisition unit 12 acquires the parameter associated with the OS (A) as a parameter to be used for the second user terminal.

Note that the available environment selection unit 24 may allow the user of the first user terminal to select a parameter of the available environment information of the second terminal and allow the user of the second user terminal to select a parameter of the available environment information of the first terminal if there is a specific connection in the game between the first user terminal and the second user terminal such as when the user of the first user terminal and the user of the second user terminal battle each other using their characters or the like in a specific game, when the battle ends, or when the user of the first user terminal and the user of the second user terminal are linked to each other by a friend application or the like in the game.

Switch Processing Unit 26

When the environment in which the game is executed is switched to another environment, the switching processing unit 26 executes processing for the other environment.

Specifically, when the available environment in the user terminal 3 is switched from a first available environment to a second available environment different from the first available environment, the switching processing unit 26 executes processing of allowing the user to continue the game in the second available environment. Here, an example will be described in which the available environment information is a type of OS.

Specifically, a case will be described where the user owns a plurality of user terminals, and plays a game on one user terminal (assuming that the game is executed on a first OS), and continuously plays the same game on another user terminal (assuming that the game is executed on a second OS different from the first OS), that is, where a game being executed on one user terminal is continuously executed on another user terminal.

In this case, the switching processing unit 26 first receives an instruction for switching from the one user terminal to the other user terminal. Then, the switching processing unit 26 receives the information related to the second OS of the other user terminal, and compares it with the information related to the first OS of the one user terminal. If the first OS and the second OS are different from each other, the switching processing unit 26 refers to the parameter storage unit 320, and causes the parameter output unit 16 to output parameters of contents for the one user terminal, and parameters of contents for the other user terminal to the one user terminal. In this case, the switching processing unit 26 may output a confirmation display such as, for example, a message of "Your currently used terminal differs in OS from the other terminal. If you switch it to the other terminal, the parameters will be changed. Do you want to switch it?". Alternatively, the switching processing unit 26 may notify the user of such a message at a timing different from a timing during execution of the game or the timing of switching the game. Note that, if the first OS and the second OS are the same, the switching processing unit 26 does not have to cause the parameter output unit 16 to output or notify the parameters of contents.

Here, the same drawing may be performed before and after the switching processing in the switching processing unit 26. In other words, in the game system 1, when the user terminal is switched from the one user terminal to the other user terminal or when the user terminal is switched from the other user terminal to the one user terminal again, the same drawing as in the environment before the switching may be performed. Note that a condition may be set that the user agrees to this drawing to be executed in exchange for virtual currency in the game. Specifically, the user who is playing the game on the one user terminal performs a predetermined drawing on the one user terminal at a predetermined timing, and after this drawing, the switching processing unit 26 switches the one user terminal to the other user terminal. Then, when a predetermined drawing is performed on the other user terminal at a predetermined timing, the game system 1 may either use parameters used in the one user terminal (e.g., the winning probabilities) for the other user terminal as it is to perform the drawing or make a predetermined correction to the parameters to perform the drawing. As a result, the game system 1 makes it possible to take over the parameters such as the winning probabilities from the one user terminal to the other user terminal on the basis of the user's intention, and to continue the game on the other user terminal under almost the same conditions as in the environment for the one user terminal.

Then, when the instruction reception unit 18 receives an instruction to switch the user terminal from the one user terminal to the other user terminal, the switching processing unit 26 executes takeover processing so that the user can continuously play, on the other user terminal, the game interrupted by the user on the one user terminal from the interrupted point. For example, in a case where the switching processing unit 26 executes the switching processing, the game progress unit 20 interrupts the game, sets the interruption time as an interruption point, and stores the progress of the game at the interruption point in the game condition storage unit 326. Then, the switching processing unit 26 refers to the game condition storage unit 326, and executes processing of continuing, on the other user terminal, the game executed on the one user terminal from the interruption point. As a result, the user can easily play the game seamlessly on each of the plurality of types of user terminals (i.e., under different OS environments) by performing the takeover processing of the user terminals.

Note that the switching processing unit 26 may associate a plurality of pieces of available environment information with one user ID according to an instruction from the user and store them in the user information storage unit 322. For example, the switching processing unit 26 may associate information indicating a plurality of types of user terminals as available environment information with one user ID. In this case, when the game is being executed on one user terminal, the switching processing unit 26 may perform control of not allowing another user terminal to execute the game, and control of allowing the plurality of user terminals to execute the game simultaneously.

Location Information Acquisition Unit 28

The location information acquisition unit 28 acquires location information of the user terminal 3. When determining a parameter associated with a content used in the game on the basis of the environment information acquired by the environment information acquisition unit 12, the parameter determination unit 14 may also determine the parameter using the location information acquired by the location information acquisition unit 28. For example, the parameter storage unit 320 may store parameters in association with the available environment information and the location information. Accordingly, as an example, the parameters can be changed between a case where the user terminal 3 is located in a first region and a case where the user terminal 3 is located in a second region even in the same available environment. Also, for example, it is possible to differentiate between a parameter to be used when the game is executed in a first region with a first user terminal operating on a first OS and a parameter to be used when the game is executed in the first region with a second user terminal operating on a second OS, and/or to differentiate between a parameter to be used when the game is executed in the second region with the first user terminal operating on the first OS and a parameter to be used when the game is executed in the second region with the second user terminal operating on the second OS.

Overview of Flow of Processing of Game System 1

FIGS. 5 to 11 illustrate an example of flow of processing in the game system according to the present embodiment.

First Example

Figure 5:
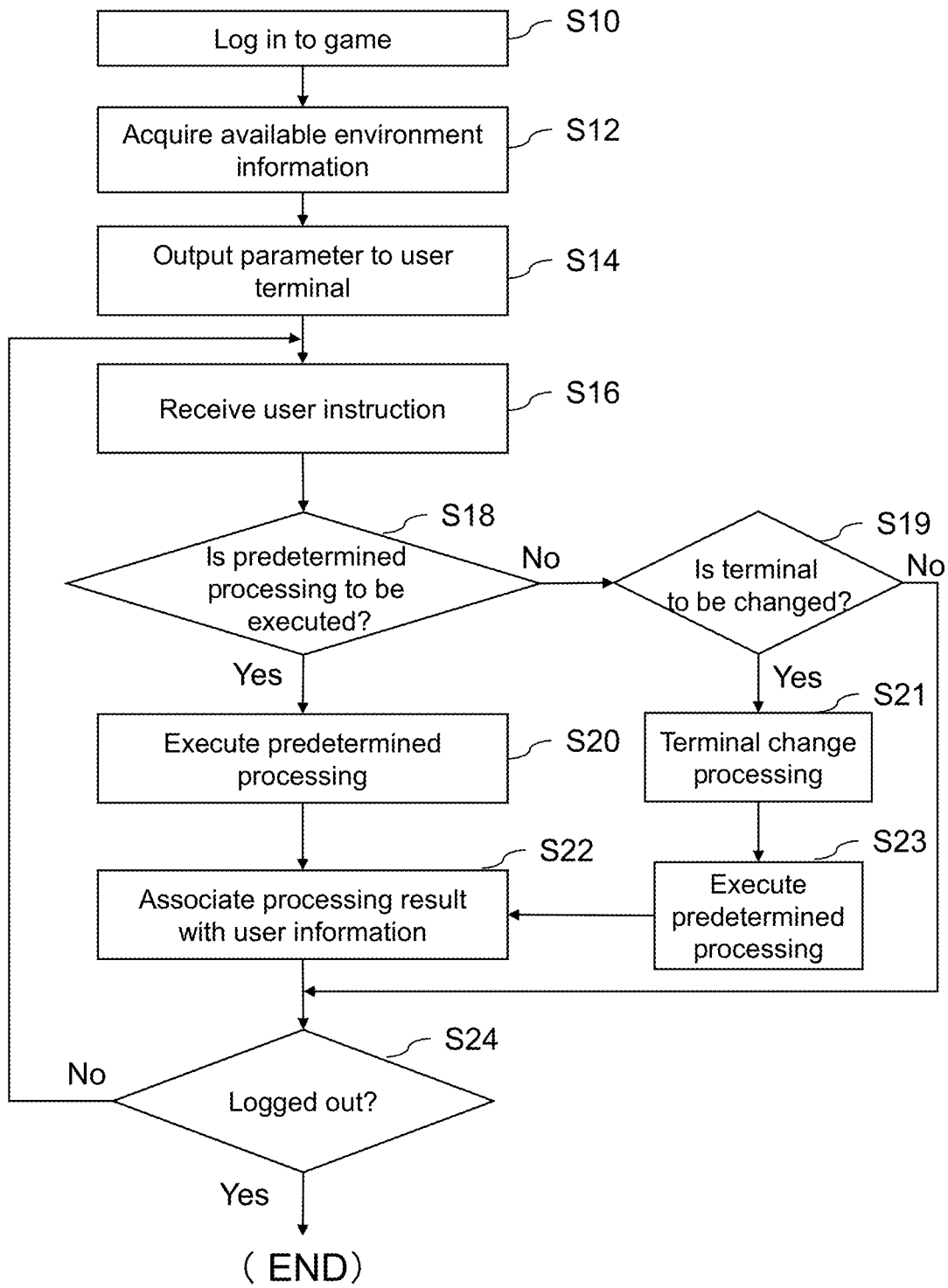
FIG. 5 is a flowchart of processing in the game system according to the embodiment.

FIG. 5 illustrates an example of flow of processing in the case of determining parameters at the time of logging in to a game in the game system according to the present embodiment. A first example is an example in which the available environment information is a type of OS.

The first example is an example of the game system 1 capable of providing a predetermined content to a user. The game system 1 includes the available environment information acquisition unit 12 that acquires information indicating a type of OS of the user terminal 3 on which the game is to be executed, and the parameter determination unit 14 that determines a parameter to be used to provide a content used in the game to the user in response to a user's input operation on the basis of the information indicating the type of OS. Here, an example will be described in which a content is provided to the user by a drawing in the game. Note that, in the first example, parameters are determined at the time of login, and the determined parameters are maintained until logout, and accordingly, it is preferable to set appearance probabilities of contents when the processing of causing the respective contents to appear in the game as the parameters.

First, in the first example, the parameter storage unit 320 stores one or more content IDs and parameters (e.g., winning probabilities) associated with the one or more content IDs in association with the information indicating the type of OS serving as the available environment information. In this state, the login processing unit 10 executes login processing in response to a login request with a predetermined account from the user terminal 3. The login request is requested, for example, each time the user causes the user terminal 3 to execute the game program. Thus, the user logs in to the game via the user terminal 3 (Step 10; hereinafter, Step is represented as "S"). Then, the available environment information acquisition unit 12 inquires of the user terminal 3 to acquire available environment information indicating a type of OS (e.g., OS (A)) as the information indicating the type of OS of the user terminal 3 (S12).

Next, the parameter determination unit 14 acquires, by using the information indicating the type of OS, serving as the available environment information acquired by the available environment information acquisition unit 12, as a key, one or more content IDs associated with the information indicating the type of OS and parameters associated with the one or more content IDs from the parameter storage unit 320, and determines the acquired parameters as parameters to be used in the game. The parameter output unit 16 outputs to the user terminal 3 the parameters acquired by the parameter determination unit 14 together with information related to the contents of the content IDs associated with the respective parameters (e.g., content name, image, and/or description of abilities) (S14). The user terminal 3 outputs the received parameters together with the information related to the contents, for example, via the display or the like so as to be perceptible to the user. Here, the game system 1 may store, for example, the parameter acquired by the parameter determination unit 14 and the information related to the content of the content ID associated with the parameter in a predetermined server outside the game system 1, and the parameter output unit 16 may acquire the parameter and the information related to the content from this server and notify the user terminal 3 of the parameter. This notification may be issued when the user is playing the game, and may be issued to the user at a timing other than when the user is playing the game (any timing during the game not being played) and/or in a place other than where the user is playing the game (e.g., an advertisement or promotion Web page for the game). In other words, in the present embodiment, the notification may not be displayed during the game, and the user may refer to a parameter acquired by the parameter determination unit 14 at any timing and/or information associated with the parameter.

Note that the parameter output unit 16 may output to the user terminal 3, in addition to the parameters acquired by the parameter determination unit 14, parameters not acquired by the parameter determination unit 14 together with information related to contents associated with the parameters and information indicating a type of OS (e.g., OS (B)) associated with the content IDs of the contents. In this case, the parameter output unit 16 notifies, for example, the display of the user terminal 3 of contents winnable in a drawing in the game when the OS (A) is selected and their winning probabilities, and contents winnable in a drawing in the game when the OS (B) is tentatively selected and their winning probabilities, by displaying them and the like. This allows the user to know which content can be acquired with what winning probability when what OS is used, and thus the user can obtain an opportunity to select a user terminal with a different OS included.

Then, the instruction reception unit 18 receives an instruction as to whether or not to perform a drawing in the game from the user via the user terminal 3 (S16). When the instruction reception unit 18 receives an instruction to perform a drawing (Yes in S18), the game progress unit 20 executes the drawing processing as predetermined processing (S20). Then, the result association unit 22 provides the user with the content that the user has acquired as a result of the drawing processing executed in the game progress unit 20 (S22). Specifically, the result association unit 22 associates the user information (e.g., user ID) with the content ID of the content that the user has acquired in the user information storage unit 322. Note that the drawing processing may include processing in which the user fails to win any content. In this case, the result association unit 22 associates information indicating that the user failed to acquire any content with the user information and stores it in the user information storage unit 322.

On the other hand, when the instruction reception unit 18 receives an instruction not to perform a drawing (No in S18), the game system 1 receives an instruction to change the user terminal from the user (S19). Note that the game system 1 may complete the drawing processing at this time point. When an instruction to change the user terminal is received from the user (Yes in S19), the switching processing unit 26 executes processing of changing the user terminal, that is, processing of switching the user terminal 3 to the other user terminal (S21). Then, when the instruction reception unit 18 receives an instruction to perform a drawing on the other user terminal, the game progress unit 20 executes the drawing processing as predetermined processing (S23). When the instruction reception unit 18 does not receive the instruction to perform the drawing on the other user terminal, the game progress unit 20 ends the drawing processing. On the other hand, when the instruction reception unit 18 receives an instruction not to perform a drawing (No in S18) and the switching processing unit 26 does not receive an instruction to change the user terminal from the user (No in S19), the game system 1 ends the drawing processing. The result association unit 22 provides the user with the content that the user has acquired as a result of the drawing processing executed in the game progress unit 20 (S22).

Then, when receiving information indicating that the user is to be logged out of the game from the user terminal 3 or the other user terminal, the login processing unit 10 executes processing of logging out of the user from the game (Yes in S24). On the other hand, when the login processing unit 10 has not received the information indicating that the user is to be logged out of the game from the user terminal 3 or the other user terminal, the instruction reception unit 18 waits for reception of an instruction as to whether or not to perform a drawing from the user terminal 3 or the other user terminal. Accordingly, the game system 1 executes the above-described processing in response to the user's instruction to perform the drawing acquired through a user's input operation on the user terminal 3 or the other user terminal, which makes it possible for the user to hold a content won in the drawing. Note that, in the game system 1, steps S10 to S24 can be repeatedly executed. Further, steps S19, S21, and S23 may be executed between any two of steps S10 to S24 as long as there is no inconsistency in the processing.

Note that the available environment information acquisition unit 12 may set a flag indicating that the user ID of the user of the user terminal 3 or the other user terminal is associated with the acquired available environment information before execution of the predetermined processing (drawing processing), that is, after 312 and before S16. The game progress unit 20 may execute the drawing processing on the basis of the user ID for which the flag has been set. Specifically, when executing the drawing processing, the game progress unit 20 checks whether or not the flag is set for the user ID, and if the flag is set, the game progress unit 20 may execute the drawing processing using parameters stored in the parameter storage unit 320.

Second Example

Figure 6:
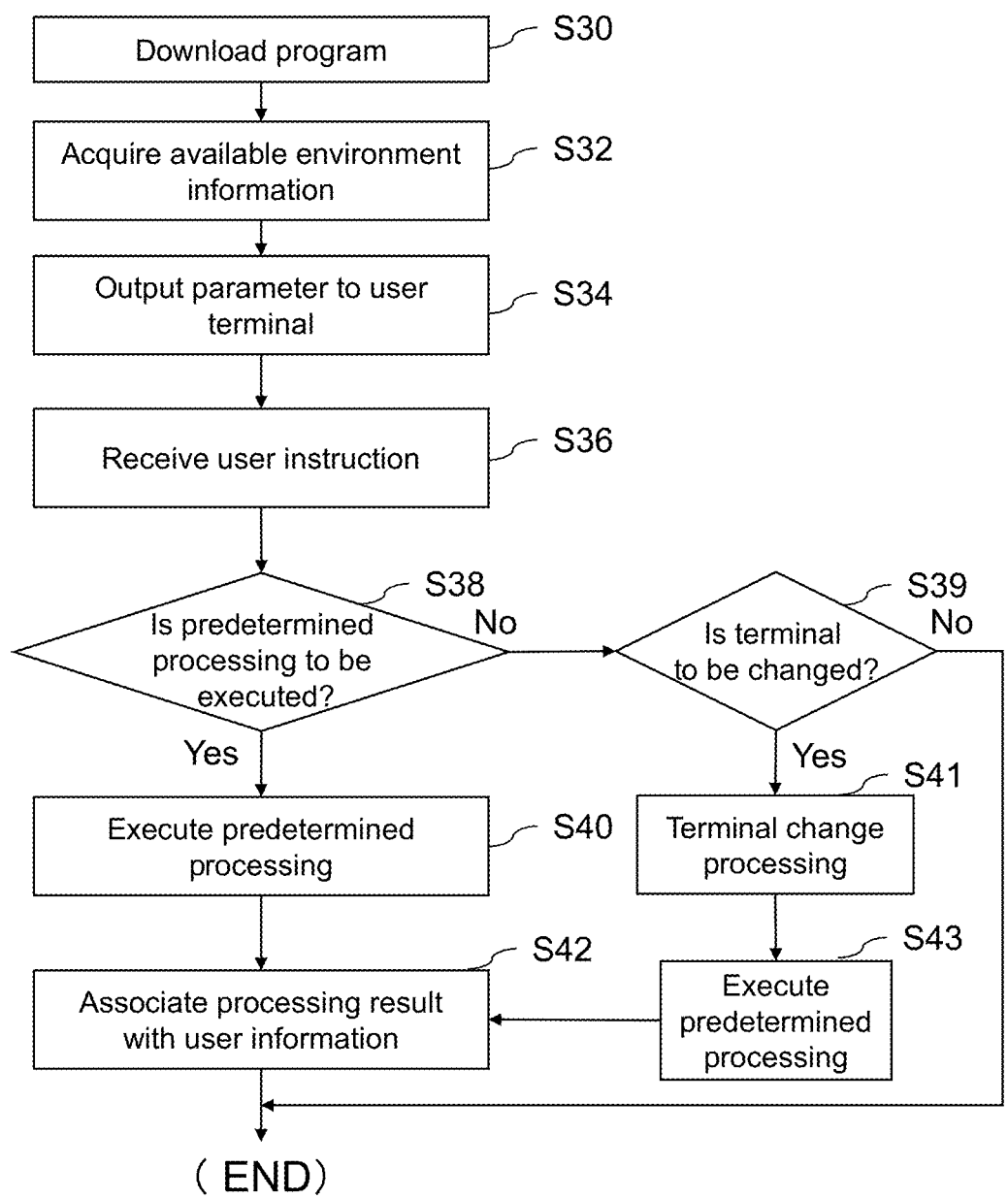
FIG. 6 is a flowchart of processing in the game system according to the embodiment.

FIG. 6 illustrates an example of flow of processing in the case of determining parameters at the time of downloading the game program or at the time of first starting the game program in the game system according to the present embodiment. A second example is an example in which the available environment information is a type of OS. Note that S34, S36, S38, S40, and S42 in FIG. 6 are the same as S14, S16, S18, S20, and S22 in FIG. 6, respectively, and a detailed description thereof will be omitted.

The second example is an example of the game system 1 capable of providing a predetermined content to a user. The game system 1 includes the available environment information acquisition unit 12 that acquires information indicating a type of OS of the user terminal 3 on which the game is to be executed from the user terminal 3 at the time of downloading the game program for the game system 1 into the user terminal 3 or at the time of first starting the game program, and the parameter determination unit 14 that determines a parameter associated with a content used in the game on the basis of the information indicating the type of OS. Here, an example will be described in which a content is provided to the user by a drawing in the game.

First, in the second example, the parameter storage unit 320 stores one or more content IDs and parameters (winning probabilities) associated with the one or more content IDs in association with the information indicating the type of OS serving as the available environment information. In addition, in the second example, the game program to be downloaded into the user terminal 3 includes the function of the available environment information acquisition unit 12 (available environment information acquisition function). Specifically, when the game program is downloaded into the user terminal 3 (S30), the available environment information acquisition function acquires available environment information indicating the type of OS as the information indicating the type of OS of the user terminal 3, which is the download destination (S32).

Then, the login processing unit 10 executes login processing in response to a login request with a predetermined account from the user terminal 3. Thus, the user logs in to the game via the user terminal 3. Note that the available environment information acquisition function may acquire available environment information indicating the type of OS as the information indicating the type of OS of the user terminal 3 when the login processing is executed (e.g., when the game is first started), instead of when the game program is downloaded into the user terminal 3.

Next, the parameter output unit 16 outputs to the user terminal 3 the parameters acquired and determined by the parameter determination unit 14 on the basis of the available environment information acquired by the available environment information acquisition function, together with information related to the contents of the content IDs associated with the respective parameters (S34). Then, the instruction reception unit 18 receives an instruction as to whether or not to perform a drawing in the game from the user via the user terminal 3 (S36).

When the instruction reception unit 18 receives an instruction not to perform a drawing (No in S38), the game system 1 receives an instruction to change the user terminal from the user (S39). Note that the game system 1 may complete the drawing processing at this time point. Then, when an instruction to change the user terminal is received (Yes in S39), the switching processing unit 26 executes processing of switching the user terminal 3 to the other user terminal (S41). Then, when the instruction reception unit 18 receives an instruction to perform a drawing on the other user terminal, the game progress unit 20 executes the drawing processing as predetermined processing (S43). When the instruction reception unit 18 does not receive the instruction to perform the drawing on the other user terminal, the game progress unit 20 ends the drawing processing. On the other hand, when the instruction reception unit 18 receives an instruction not to perform a drawing (No in S38) and the switching processing unit 26 does not receive an instruction to change the user terminal from the user (No in S39), the game system 1 ends the drawing processing. The result association unit 22 provides the user with the content that the user has acquired as a result of the drawing processing executed in the game progress unit 20 (S42).

On the other hand, when the instruction reception unit 18 receives an instruction to perform a drawing (Yes in S38), the game progress unit 20 executes the drawing processing as predetermined processing (S40). Then, the result association unit 22 provides the user with the content that the user has acquired as a result of the drawing (S42). Note that, in the game system 1, steps S30 to S43 can be repeatedly executed. Further, steps S39, S41, and S43 may be executed between any two of steps S30 to S42 as long as there is no inconsistency in the processing.

Third Example

Figure 7:
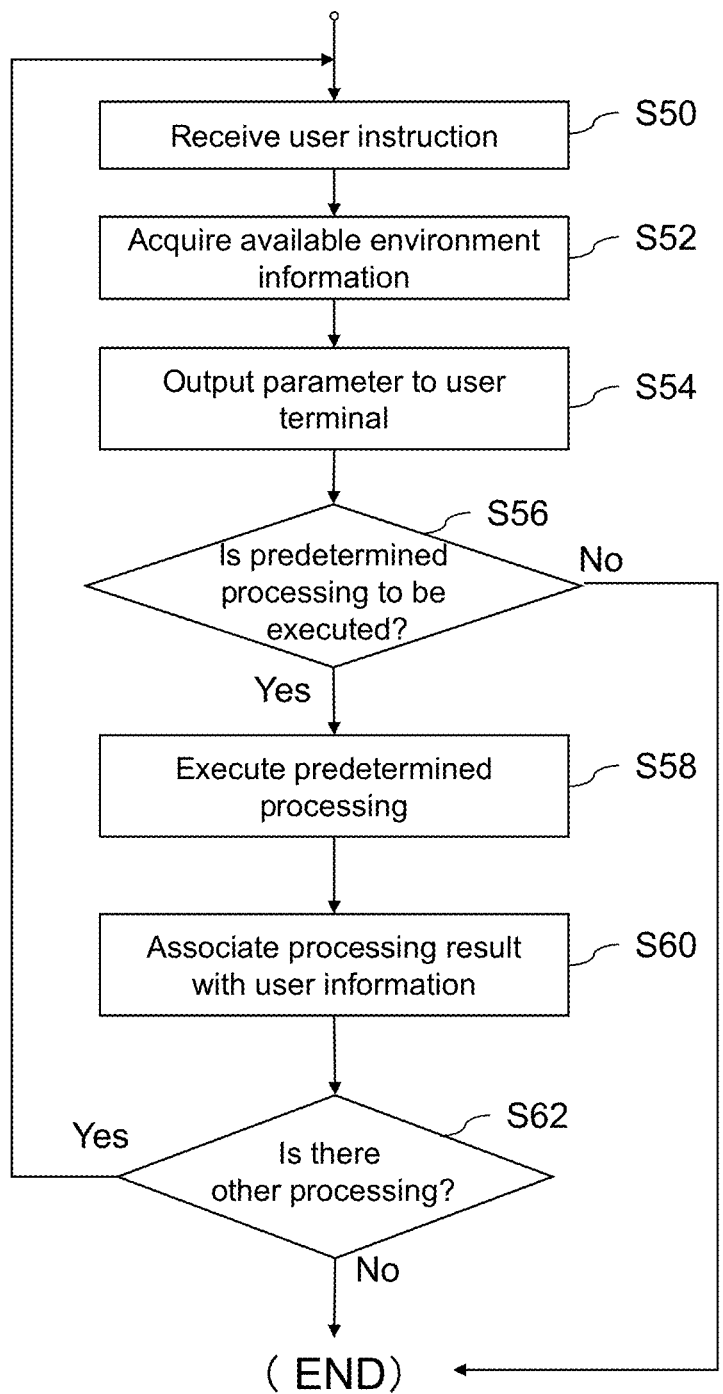
FIG. 7 is a flowchart of processing in the game system according to the embodiment.

FIG. 7 illustrates an example of flow of processing in the case of determining parameters each time predetermined processing in a game is executed in the game system according to the present embodiment. A third example is an example in which the available environment information is a type of OS. Note that S52, S54, S56, S58, and S60 in FIG. 7 are the same as S12, S14, S18, S20, and S22 in FIG. 7, respectively, and a detailed description thereof will be omitted.

The third example is an example of the game system 1 capable of providing a predetermined content to a user. The game system 1 includes the available environment information acquisition unit 12 that acquires information indicating a type of OS of the user terminal 3 on each time predetermined processing in the game is executed, and the parameter determination unit 14 that determines a parameter associated with a content used in the game to the user on the basis of the information indicating the type of OS. Here, an example will be described in which a content is provided to the user by a drawing in the game.

First, in the third example, the parameter storage unit 320 stores one or more content IDs and parameters (winning probabilities) associated with the one or more content IDs in association with the information indicating the type of OS serving as the available environment information. In this state, the login processing unit 10 executes login processing in response to a login request with a predetermined account from the user terminal 3. After the user logs in to the game, the game progress unit 20 executes predetermined processing according to the progress of the game. The predetermined processing includes processing of drawing a content, processing of causing the content to appear in the game, and the like. Here, the processing of drawing the content will be described as an example.

The instruction reception unit 18 receives an instruction as to whether or not to perform a drawing in the game from the user via the user terminal 3, as the predetermined processing (S50). When the instruction reception unit 18 receives an instruction to perform a drawing, the available environment information acquisition unit 12 inquires of the user terminal 3 to acquire available environment information indicating a type of OS as the information indicating the type of OS of the user terminal 3 (S52). When the instruction reception unit 18 receives an instruction not to perform a drawing, the processing may be terminated at that time.

Next, the parameter determination unit 14 acquires, by using the information indicating the type of OS, serving as the available environment information acquired by the available environment information acquisition unit 12, as a key, one or more content IDs associated with the information indicating the type of OS and parameters associated with the one or more content IDs from the parameter storage unit 320. The parameter output unit 16 outputs to the user terminal 3 the parameters acquired by the parameter determination unit 14 together with information related to the contents of the content IDs associated with the respective parameters (S54). The user terminal 3 outputs the received parameters together with the information related to the contents so as to be perceptible to the user.

Then, when the instruction reception unit 18 receives an instruction not to execute the drawing (No in S56), the game system 1 ends the drawing processing. On the other hand, when the instruction reception unit 18 receives an instruction to perform a drawing (Yes in S56), the game progress unit 20 executes the drawing processing (S58). Next, the result association unit 22 provides the user with the content that the user has acquired as a result of the drawing processing executed in the game progress unit 20 (S60). Then, when there is other processing (e.g., another drawing processing), the instruction reception unit 18 waits for reception of an instruction as to whether or not to perform another drawing from the user terminal 3 (Yes in S62). On the other hand, when there is no other processing, the game system 1 ends the processing (No in S62).

In the third example, the game system 1 can conform the available environment information of the user terminal every time predetermined processing such as the drawing processing in the game is executed, which makes it possible to allow the user to change the user terminal at any time before that processing, that is, to change the type of terminal at a timing between a plurality of steps of drawing processing on the basis of the user's decision. In this case, the switching processing unit 26 executes processing of switching the user terminal. When the one user terminal is switched to the other user terminal, the game progress unit 20 resumes, in the other user terminal, the game from the point of interruption of the game in the one user terminal. This allows the user to continue the game under conditions favorable to the user. Note that, in the game system 1, steps 350 to S62 can be repeatedly executed. Further, the steps for the type change described above may be executed between any two of steps 350 to 362 as long as there is no inconsistency in the processing.

Fourth Example

Figure 8:
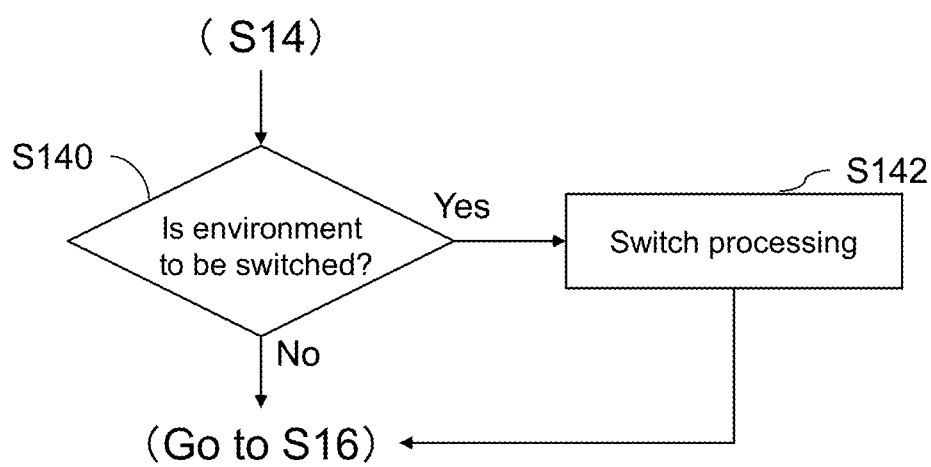
FIG. 8 is a flowchart of processing in the game system according to the embodiment.

FIG. 8 illustrates a part of an example of flow of processing in a case where the user switches the available environment in the game system according to the present embodiment. A fourth example is an example in which the available environment information is a type of user terminal. Note that FIG. 8 illustrates substantially the same steps as those in the flow of FIG. 5 except that a predetermined step is introduced between S14 and S16 in FIG. 5, and thus a detailed description thereof is omitted except for differences. Further, in the example of FIG. 8, S140 and S142 are introduced between S14 and S16, but S140 and S142 may be executed before and after other steps as long as there is no inconsistency in the flow of processing.

First, after S14, the switching processing unit 26 receives an instruction to switch the user terminal to another user terminal from the user terminal 3 via the instruction reception unit 18. Then, the switching processing unit 26 refers to the parameter storage unit 320, and causes the parameter output unit 16 to output parameters of contents for the user terminal 3, and parameters of contents for another user terminal to the user terminal 3. In this case, the switching processing unit 26 may also output a confirmation display such as, for example, a message of "If you switch user terminal 3 to another user terminal, the appearance probability of the contents will change".

Then, when the instruction reception unit 18 receives an instruction to execute switching the user terminal from the user terminal 3 (Yes in S140), the switching processing unit 26 executes the switching processing (takeover processing) so that the game on the user terminal 3 can be continued on another user terminal (S142). On the other hand, when the instruction reception unit 18 does not receive the instruction to execute switching the user terminal from the user terminal 3 (No in S140), the steps after S16 are executed.

Fifth Example

Figure 9:
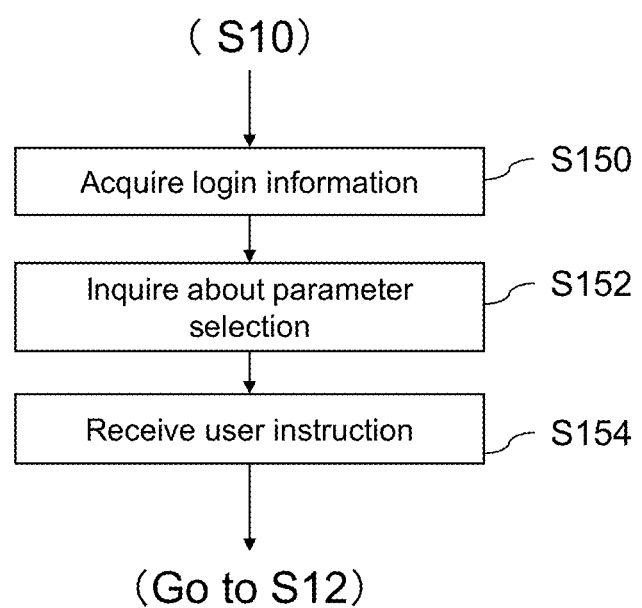
FIG. 9 is a flowchart of processing in the game system according to the embodiment.

FIG. 9 illustrates a part of an example of flow of processing in a case where a plurality of users are playing the same game in the game system according to the present embodiment. A fifth example is an example in which the available environment information is types of OSs of the user terminals. Note that FIG. 9 illustrates substantially the same steps as those in the flow of FIG. 5 except that a predetermined step is introduced between S10 and S12 in FIG. 5, and thus a detailed description thereof is omitted except for differences. Further, in the example of FIG. 9, S150, S152, and S154 are introduced between S10 and S12, but S150, 3152, and 3154 may be executed before and after other steps as long as there is no inconsistency in the flow of processing.

First, the available environment selection unit 24 acquires from the login processing unit 10 information indicating that a plurality of users who are simultaneously playing the game are logging in with their user terminals (S150). Next, the available environment selection unit 24 inquires of each of the plurality of user terminals which are executing the game as to whether or not to use a parameter associated with the available environment information of the available environment of any other user terminal instead of the available environment of the user terminal itself (S152). Then, the available environment selection unit 24 receives a selection instruction from each user terminal as to whether to select either its own available environment or another user's available environment via the instruction reception unit 18 (S154). Subsequently, the available environment selection unit 24 supplies information on the received instruction to the available environment information acquisition unit 12. The available environment information acquisition unit 12 acquires the available environment information of the other user terminal selected by the available environment selection unit 24 according to one user's selection, as available environment information for the one user terminal (S12).

Note that, when a plurality of users who are simultaneously playing the game battle each other and one user wins the battle, the available environment selection unit 24 may inquire of only the winner as to whether or not to use a parameter associated with the available environment information of the available environment of another user terminal (the user terminal of one of the losers) instead of the available environment of the winner's own user terminal. In this case, the available environment selection unit 24 receives a selection instruction from the user terminal of the winner of the battle via the instruction reception unit 18 (S154). Furthermore, when determining a parameter on the basis of the available environment information, the parameter determination unit 14 may use the parameter to be used in the user terminal of one user who is the winner of the battle (i.e., the parameter to be used in the user terminal of another user who is the opponent), or may use the parameter which is increased by using virtual currency and/or a predetermined item in the game.

Thus, in the game system 1, it is possible to select, in the user terminal of a user, the available environment in the user terminal of another user, and also to acquire a content that is acquirable in the user terminal of another user but not acquirable in the user's own user terminal, or a content that is difficult to acquire due to a low winning probability or the like. Therefore, the game system 1 makes it possible to encourage interaction between a plurality of users.

Sixth Example

FIG. 10 illustrates an example of flow of processing in a case where the available environment is a version of game software and a parameter can be determined by selecting any version in the game system according to the present embodiment. Note that S70, S72, and S76 to S82 in FIG. 10 are the same as S12, 314, and S16 to S22 in FIG. 10, respectively, and a detailed description thereof will be omitted.

The sixth example is an example of the game system 1 capable of providing a predetermined content to a user. The game system 1 includes the available environment information acquisition unit 12 that acquires information related to a version of game software of the user terminal 3 that is to execute the game from the user terminal 3, and the parameter determination unit 14 that determines a parameter associated with a content used in the game on the basis of the acquired information related to a previous or current version of the game software. Here, an example will be described in which a content is provided to the user by a drawing in the game. Further, in the sixth example, the user terminal 3 can execute the game of any of a plurality of different versions (e.g., current or previous versions) of the game software.

A social game or the like requires updating a software version to correct a bug in the game or add a new game specification to the software in some cases. When the version is updated, it is necessary to prompt the user to voluntarily download the updated version of the software from a platform that provides the software into the user terminal. Here, in the case of a significant specification change such as updating of data or the like required for the progress of the game, since the version update of software is indispensable, a link to the platform may be displayed on the screen of the user terminal to access the server of the platform in order to prevent the user from playing the game after the game is started.

On the other hand, if the game cannot be played even during version update that does not have significantly influence on the progress of the game (small influence) such as bug fixing on the screen display, the interest of the user who wants to play the game immediately may be reduced. Accordingly, in a case of version update such as minor fixing, the user may be allowed to update the version at any timing by the user by displaying "Notification" in the game.

However, in this case, although the game administrator can prepare an environment that allows the user to immediately play the game, the number of users who play the game with old version software without version update may not be reduced. In other words, the update of the old version software may not be executed beyond the expectation of the game administrator. Therefore, in the sixth example, an example of a game system will be described that can prompt the user to voluntarily perform version update even if it is version update such as minor fixing of the software.

First, in the sixth example, the parameter storage unit 320 stores one or more content IDs and winning probabilities serving as parameters associated with the one or more content IDs in association with the information indicating the version of game software serving as the available environment information. If there are a plurality of versions of game software, the parameter storage unit 320 stores the content IDs and the parameters in association with information indicating all or a part of the plurality of versions. Then, the available environment information acquisition unit 12 inquires of the user terminal 3 to acquire available environment information indicating a version of game software to be executed in the user terminal 3 (S70).

Next, the parameter determination unit 14 acquires, by using the information indicating the version of game software acquired by the available environment information acquisition unit 12 as a key, one or more content IDs associated with the information indicating the version of game software and winning probabilities associated with the one or more content IDs from the parameter storage unit 320. The parameter output unit 16 outputs to the user terminal 3 the winning probabilities acquired by the parameter determination unit 14 together with information related to the contents of the content IDs (S72). The user terminal 3 outputs the received winning probabilities together with the information related to the contents so as to be perceptible to the user.

Note that the parameter determination unit 14 may use virtual currency and/or items used in the game to determine the winning probabilities serving as parameters on the basis of information related to a specific version of game software selected by the user from a plurality of different versions of game software. In other words, the parameter determination unit 14 may acquire, by using the information indicating a version of game software specified by the user as a key, one or more content IDs associated with that information and winning probabilities associated with the one or more content IDs from the parameter storage unit 320 to determine the winning probabilities as the parameters.

Here, the parameter output unit 16 may output to the user terminal 3, in addition to the winning probabilities acquired by the parameter determination unit 14, winning probabilities not acquired by the parameter determination unit 14 together with information related to contents associated with the winning probabilities and information indicating a version of game software associated with the content IDs of the contents. In this case, the parameter output unit 16 displays, for example, on the display of the user terminal 3, contents winnable in a drawing in the game when the current version of game software (old version) is selected and their winning probabilities, and contents winnable in a drawing in the game when a new version of game software is selected and their winning probabilities. In this case, the winning probabilities when the new version of game software is selected may be set higher than the winning probabilities in the old version of game software. Accordingly, the game system 1 can make the user recognize that the use of the new version of game software is more advantageous for acquiring the contents, and thus it is possible to prompt the user to update the version of game software.

Then, the instruction reception unit 18 receives from the user via the user terminal 3 an instruction as to whether to use the old version or the new version as the version of game software. When the instruction reception unit 18 receives an instruction to use the new version, the game progress unit 20 interrupts the game, connects to a server of a platform that provides the software, and updates the version. After the software version is updated on the user terminal 3, the game progress unit 20 resumes the game from the point where it was interrupted.

Then, when the instruction reception unit 18 receives an instruction to continue to use the old version, or when the game progress unit 20 resumes the game, the instruction reception unit 18 receives from the user via the user terminal 3 an instruction as to whether or not to perform a drawing in the game (S76). When the instruction reception unit 18 receives an instruction not to execute the drawing (No in S78), the game system 1 ends the drawing processing. On the other hand, when the instruction reception unit 18 receives an instruction to perform a drawing (Yes in S78), the game progress unit 20 executes the drawing processing (S80). In this case, if the software version has been updated, the drawing processing is executed with the winning probabilities for the new version. Then, the result association unit 22 provides the user with the content that the user has acquired as a result of the drawing (S82).

Note that, when the user performs a drawing, the instruction reception unit 18 may make it possible to select winning probabilities for a version different from the version of the game software being executed on the user terminal 3, on the assumption that the user uses in-game virtual currency and a predetermined item. For example, the parameter storage unit 320 stores one or more content IDs and winning probabilities of the contents associated with the one or more content IDs in association with information indicating an old version of game software, and also stores one or more content IDs different from those associated with the information indicating the old version and the winning probabilities of the contents associated with the one or more content IDs in association with the information indicating the new version.

Then, the parameter output unit 16 outputs to the user terminal 3 the contents acquirable under the environment of the old version of game software and the contents acquirable under the environment of the new version of game software. In this case, in a case where the new version of game software is running on the user terminal 3, when the instruction reception unit 18 receives an instruction to use the in-game virtual currency and a predetermined item from the user, the game progress unit 20 can perform a drawing under the environment of the old version of game software. This allows the user to acquire contents (e.g., fossil contents) not acquirable with the new version of game software.

Seventh Example

FIG. 11 illustrates an example of flow of processing in the case of executing a game capable of holding a character or an evolved character in the game system according to the present embodiment. A seventh example is an example in which the available environment information is a type of OS. In the seventh example, a case will be described where a predetermined number of predetermined items are required to acquire a predetermined character in the game, or where a predetermined number of predetermined items are required to evolve a predetermined character. Note that FIG. 11 illustrates substantially the same steps as those in the flow of FIG. 5 except that the steps of 390 and S92 are introduced before S94 corresponding to S12 in FIG. 5, and thus a detailed description thereof is omitted. In other words, S94, S96, and S100 to S104 in the example of FIG. 11 are the same as S12, S14, and S18 to S22 in FIG. 5, respectively, and a detailed description thereof will be omitted.

The seventh example is an example of the game system 1 capable of providing a predetermined content (character) to a user. The game system 1 includes the available environment information acquisition unit 12 that acquires information indicating a type of OS of the user terminal 3 on which the game is to be executed, and the parameter determination unit 14 that determines the number of predetermined items required to acquire a content used in the game or the number of predetermined items required to evolve the content on the basis of the information indicating the type of OS.

In the seventh example, the parameter storage unit 320 stores one or more character IDs, item IDs of predetermined items serving as parameters associated with the one or more character IDs, and the number of items, in association with the information indicating the type of OS. Here, the item is an item required to acquire a character in the game or an item required to change the abilities of the character, and the number of items is the number of items required to acquire a character in the game or the number of items required to change the abilities of the character. Then, during the execution of the game on the user terminal 3, the game progress unit 20 generates a predetermined event in response to an instruction from the user received by the instruction reception unit 18 or at a predetermined timing determined by the game progress unit 20 (S90). This event is, for example, a character acquisition event or a character evolution event.

In response to the occurrence of the event, the instruction reception unit 18 receives an instruction as to whether or not to respond to the event from the user (S92). When the instruction reception unit 18 receives an instruction to respond to the event from the user, the available environment information acquisition unit 12 inquires of the user terminal 3 to acquire available environment information indicating a type of OS as the information indicating the type of OS of the user terminal 3 (S94). On the other hand, when the instruction reception unit 18 receives an instruction not to respond to the event from the user, the game system 1 determines that the user does not respond to the event and continues the processing.

Next, the parameter determination unit 14 acquires, by using the information indicating the type of OS acquired by the available environment information acquisition unit 12 as a key, one or more character IDs associated with the information indicating the type of OS, item IDs of predetermined items serving as parameters associated with the one or more character IDs, and the number of items from the parameter storage unit 320. The parameter output unit 16 outputs to the user terminal 3 the parameters acquired by the parameter determination unit 14 together with information related to the characters corresponding to the character IDs (S96). The user terminal 3 outputs the received parameters together with the information related to the characters so as to be perceptible to the user.

Then, the instruction reception unit 18 receives from the user via the user terminal 3 an execution instruction as to whether or not to use a predetermined number of predetermined items to acquire a predetermined character, or an execution instruction as to whether or not to use a predetermined number of predetermined items to evolve the predetermined character (S98). When the instruction reception unit 18 does not receive an instruction to acquire a predetermined character or an instruction to evolve the predetermined character (No in S100), the game system 1 ends the processing. On the other hand, when the instruction reception unit 18 receives an instruction to acquire a predetermined character or an instruction to evolve the predetermined character (Yes in S100), the game progress unit 20 executes processing of acquiring the predetermined character, or of evolving the predetermined character (S102). Then, the result association unit 22 provides the user with the character that the user has acquired or the evolved character as a result of the processing executed in the game progress unit 20 (S104).

OTHER EXAMPLES

Example 1

In the case of determining a parameter of a content used in the game on the basis of the available environment information, the game system 1 according to the present embodiment may determine a parameter at a predetermined event. For example, when the content is a character and the parameter is a power of the character (e.g., a power such as an attack power or a defense power used in a battle in a game), the game system 1 may determine the power of the character on the basis of the available environment information each time a predetermined event starts. Note that the event may be, for example, a battle between characters.

In this case, the parameter storage unit 320 stores the character ID of the character and the power point serving as a parameter of the character in association with the available environment information. Then, the game progress unit 20 can make progress of the game using the power point of the character determined by the parameter determination unit 14 on the basis of the available environment information acquired by the available environment information acquisition unit 12.

Example 2

Further, in the game system 1, it is also possible to change item variations in an item shop in the game. For example, an example will be described in which an item shop that provides one or more items to a user in exchange for in-game virtual currency or a predetermined item is provided in a game executed in the game system 1.

In this case, the information storage unit 32 may have an item shop table that stores information related to the item shop. The item shop table stores item IDs of one or more items provided by the item shop in association with an item shop ID. Then, the parameter storage unit 320 stores item shop IDs as the content IDs in association with their respective pieces of the available environment information. In this case, the parameter determination unit 14 receives an instruction to cause a predetermined character or the like operated by the user in the game to enter an item shop in the game in response to a user's operation. Alternatively, the parameter determination unit 14 may display an item shop icon or the like on the display or the like of the user terminal, and receive an instruction to cause the character and the like to enter the item shop in response to receiving an instruction that the user has selected the icon. Then, the parameter determination unit 14 acquires an item shop ID on the basis of a piece of available environment information acquired by the available environment information acquisition unit 12. Subsequently, the game progress unit 20 can display items of one or more item IDs stored in the item shop table in association with the item shop ID acquired by the parameter determination unit 14 in the item shop in the game. Thus, in the game system 1, it is possible to change item variations in an item shop in the game.

In this way, the parameter storage unit 320 stores content IDs in association with their respective pieces of available environment information, and the parameter determination unit 14 can determine a content to be used in the game on the basis of a piece of available environment information. For example, when the parameter storage unit 320 stores one content ID in association with one piece of available environment information and also stores another content ID in association with another piece of available environment information, different contents can be provided to the user depending on the available environment of the user terminal 3.

Example 3

Furthermore, in the game system 1, when determining a parameter, the parameter determination unit 14 may use information on the date and time of year, month, day, hour, minute, and second in the real world at the time of determination, and/or a predetermined time frame (e.g., two periods of time in which one day is divided into morning and afternoon, and four seasons in which one year is divided into four zones) (hereinafter, simply referred to as "time information"). For example, the parameter storage unit 320 may store parameters in association with the available environment information, time information, and content IDs. As an example, the parameter storage unit 320 may store the parameters associated with the available environment information and the content IDs so that the parameters are associated with each of daytime from 0:00 to 12:00 and nighttime from 12:00 to 24:00 in the real world time. In this case, according to the time in the real world, the parameter determination unit 14 can switch between the daytime parameters and the nighttime parameters even under the same available environment information.

Example 4

Further, in the game system 1, the available environment information may be determined on the user terminal 3 side, and a parameter may be determined in the user terminal 3 without supplying the available environment information from the user terminal 3 to the server of the game system 1. In other words, the user terminal 3 may specify the available environment information of the user terminal 3 itself, and acquire the parameter from the parameter storage unit 320 using the specified available environment information. In this case, the user terminal 3 has some or all of the functions of the available environment information acquisition unit 12 and the parameter determination unit 14.

For example, suppose that a game is executed in the user terminal 3, and a drawing for acquiring a character is performed. In addition, suppose that the available environment information indicates a type of OS. In this case, the user terminal 3 specifies the information indicating the type of OS of the user terminal 3. Then, the user terminal 3 acquires the parameter associated with the content ID stored in the parameter storage unit 320 in association with the specified type of OS. The game system 1 uses the parameter acquired by the user terminal 3 to make progress of the game (e.g., a drawing).

Example 5

Further, in the game system 1, information related to an account used in an SNS, a predetermined game service, or the like is used as the available environment information, and after a game is executed using one account on one user terminal, the game can be continuously executed using the same account on another user terminal. In other words, in the game system 1, account cooperation can be used. In this case, the game condition storage unit 326 stores game information including the progress of the game in association with the user's account.

For example, a case will be described where the user has registered with one account for an SNS or the like, logs in to a game with the one account, and then switches the one account to another account to play the game. In this case, the switching processing unit 26 first receives an instruction to log out the account on the one user terminal. Then, the switching processing unit 26 refers to the parameter storage unit 320, and causes the parameter output unit 16 to output parameters of contents for the one user terminal, and parameters of contents for another user terminal to the one user terminal. In this case, the switching processing unit 26 may output a confirmation display such as, for example, a message of "If you switch one user terminal to another user terminal, the parameters will be changed. Do you want to switch it?". Note that, as in the above description of the switching processing unit 26, in the game system 1, when the user terminal is switched from the one user terminal to the other user terminal or when the user terminal is switched from the other user terminal to the one user terminal again, the same drawing as in the environment before the switching may be performed. A condition may be set that the user agrees to this drawing to be executed in exchange for virtual currency in the game.

Then, when the instruction reception unit 18 receives an instruction to log out from the one user terminal, the switching processing unit 26 executes takeover processing so that the user can continuously play, on the other user terminal, the game interrupted by the user with one account on the one user terminal from the interrupted point. For example, in a case where the switching processing unit 26 executes the switching processing, the game progress unit 20 interrupts the game, sets the interruption time as an interruption point, and stores the progress of the game at the interruption point in association with the one account in the game condition storage unit 326. Then, the switching processing unit 26 refers to the game condition storage unit 326, and executes processing of continuing, on the other user terminal, the game executed with the one account from the interruption point. This account cooperation makes it possible for the user to play the game seamlessly on various user terminals.

Further, the parameter determination unit 14 may make a correction such as increase or decrease to the parameter according to the type of account used for account cooperation and/or the number of types of account services used for account cooperation (hereinafter, simply referred to as "account information"). In other words, the parameter determination unit 14 can refer to the parameter storage unit 320, acquire a parameter stored in the parameter storage unit 320 in association with account information acquired by the available environment information acquisition unit 12, make a correction determined based on the account information to the parameter, and use the corrected parameter as a parameter to be determined. For example, the parameter determination unit 14 may make a correction to a predetermined parameter so that the value of the predetermined parameter increases as the number of account cooperation increases. Further, the parameter determination unit 14 may use different parameters for each type of account. For example, the parameter determination unit 14 may increase the parameter for one character in one type of account, while decreasing or not changing the parameter for the one character in another type of account.

Example 6

Further, in the game system 1, even when the user has registered with a plurality of accounts, logs in to a game with one account, and then switches from the one account to another account to play the game, the user can continue, with the other account, the game that the user were playing with the one account.

For example, the switching processing unit 26 receives an instruction to switch the account from the user terminal 3. Then, the switching processing unit 26 refers to the parameter storage unit 320, and causes the parameter output unit 16 to output parameters of contents for one account, and parameters of contents for another account to the user terminal 3. In this case, the switching processing unit 26 may output a confirmation display such as, for example, a message of "If you switch one account to another account, the parameters will be changed. Do you want to switch it?".

Here, in the game system 1, when the account is switched from the one account to the other account or when the account is switched from the other account to the one account again, the same drawing as in the environment before the switching may be performed. Note that a condition may be set that the user agrees to this drawing to be executed in exchange for virtual currency in the game. Specifically, the user who has logged in to the game with the one account performs a predetermined drawing at a predetermined timing under the environment with the one account, and after this drawing, the switching processing unit 26 switches the one account to the other account. Then, when a predetermined drawing is performed under the environment with the other account at a predetermined timing, the game system 1 may either use parameters used with the one account for the other account as it is to perform the drawing or make a predetermined correction to the parameters to perform the drawing. As a result, the game system 1 makes it possible to take over the parameters such as the winning probabilities from the one account to the other account on the basis of the user's intention, and to continue the game under almost the same conditions as in the environment for the one account.

Then, when the instruction reception unit 18 receives the instruction to switch the account from the user terminal 3, the switching processing unit 26 executes takeover processing so that the user can continuously play the game interrupted by the user on one account from the interrupted point on the other account. For example, in a case where the switching processing unit 26 executes the switching processing, the game progress unit 20 interrupts the game, sets the interruption time as an interruption point, and stores the progress of the game at the interruption point in the game condition storage unit 326. Then, the switching processing unit 26 refers to the game condition storage unit 326, and executes processing of continuing the game executed on the one account from the interruption point on the other account. This takeover processing for accounts makes it possible for the user to play the game seamlessly with each of the plurality of accounts.

Example 7

The game system 1 according to the present embodiment may determine whether or not a content is allowed to be acquired as a parameter of the content used in the game on the basis of the available environment information. For example, when the content is an item and the parameter is information indicating whether or not the item is allowed to be acquired, the game system 1 may determine whether or not the user is allowed to acquire the item on the basis of the available environment information. As an example, the game system 1 may set one or more types of items that is impossible to be acquired by the user in a way that they are associated with one type of OS which is a piece of available environment information. In other words, one or more items that are not allowed to be acquired may be set as long as the user selects one OS and then plays the game.

In this case, the parameter storage unit 320 stores an item ID of an item and information indicating whether or not to allow acquisition of the item, which is a parameter of the item (i.e., information indicating that the item is allowed to be acquired or information indicating that the item is not allowed to be acquired), in association with the available environment information. Then, when the information indicating whether or not the item is allowed to be acquired, which is determined by the parameter determination unit 14 on the basis of the available environment information acquired by the available environment information acquisition unit 12 is information indicating that the item is allowed to be acquired, the game progress unit 20 makes progress of the game with the user not allowed to acquire the item.

Advantageous Effects of Embodiment

The game system 1 according to the present embodiment can change the parameters of the contents to be used in the game depending on differences in available environment of the game such as a type of OS, a type of browser if the game is a browser game, a version of game program, a type of user terminal, a type of user account, and a condition of account cooperation, so that the winning probabilities of the contents, the appearance probabilities of the contents, the abilities of the contents, and the like can be changed depending on the available environment. In this way, the game system 1 according to the present embodiment makes it possible to allow the user himself/herself to select an available environment according to his/her request. As a result, the game system 1 can improve the playability of the game and enhance the user's consent without causing the user to suspect that the game administrator controlled a predetermined parameter to be used in the game inappropriately.

For example, in a case where a character is provided to the user by a drawing in the game, suppose that there are a first user terminal operating on a first OS and a second user terminal operating on a second OS, and the parameter storage unit 320 associates a first winning probability of a first character with the available environment information of the first OS, and associates a second winning probability of the first character with the available environment information of the second OS (e.g., the first winning probability<the second winning probability). The game system 1 can display, on the user terminal, characters and their winning probabilities that the user can acquire when a drawing is performed on a first user terminal, and characters and their winning probabilities that the user can acquire when a drawing is performed on a second user terminal. Accordingly, if the user wants to possess the first character, the user can select to play the game on the second user terminal. In this way, the game system 1 according to the present embodiment makes it possible to allow the user himself/herself to select an available environment according to his/her request. As a result, the game system 1 can improve the playability of the game and enhance the user's consent without causing the user to suspect that the game administrator controlled a predetermined parameter to be used in the game inappropriately.

In addition, when the user terminals of a plurality of users are executing the same game or a predetermined event or stage in the same game at the same time, the game system 1 according to the present embodiment makes it possible to replace the available environment information for one user terminal with the available environment information for another user terminal. Thus, the game system 1 makes it possible to allow active interaction between users.

Game Program

Each of the components included in the game system 1 according to the present embodiment illustrated in FIGS. 1 and 3 to 11 may be implemented by causing a processor such as a central processing unit (CPU) to execute a program (i.e., a game program), that is, by software. Each component may also be implemented by writing a program in advance in a hardware component which is an electronic component such as an integrated circuit (IC). Note that software and hardware components may be used together. As noted above, an exemplary configuration of this combination of software and hardware components is provided above in relation to FIG. 2.

The game program according to the present embodiment may be embedded in, for example, an IC or a ROM in advance. The game program may also be provided as a computer program recorded in a computer-readable recording medium, such as a magnetic recording medium, an optical recording medium, or a semiconductor recording medium, in a file in an installable format or an executable format. The recording medium storing the program may be a non-transitory recording medium such as a CD-ROM or a DVD. Further, the game program may be stored in a computer connected to a communication network such as the Internet in advance so that it can be provided by download via the communication network. For example, the game program according to the present embodiment may be provided as a client program that runs for each of various available environments (e.g., for each OS).

In addition, the game program according to the present embodiment may be provided as a server game program, capable of two-way communication with a plurality of game clients, generated from same middleware (game engine). In this case, the game program is not a program optimized for a specific OS, and changes a predetermined parameter to be used in the game just by simply transmitting and receiving OS information, which is available environment information, between the client and the server, regardless of which OS is used when a drawing or the like is performed. In other words, no matter what OS is installed in the user terminal, the server only receives the OS information from the client, and the server changes the parameter on the basis of the received OS information. Accordingly, the game program does not need to be prepared to have different contents for each type of OS, which is preferable because, for example, a bug check of the program can be omitted, and trouble due to a difference between the OSs of the user terminals can be reduced.

Specifically, first, the source code of the game program for the game system 1 according to the present embodiment is built into a plurality of software package file formats different depending on OSs using middleware. For example, the middleware builds the game program into a software package file format for a first OS and a software package file format for a second OS different from the first OS.

Next, the administrator uploads the software package acquired from the middleware to a download site for each OS (e.g., a store that can provide a predetermined program to user terminals). Note that the name of the software package displayed on the store may be changed so that it is easy to recognize that the parameters corresponding to the game contents are different in each store. However, even in this case, the software package uploaded to one store and the software package uploaded to another store have the same logical structure involving at least the processing of providing a content according to the present embodiment among the logical structures of the program, except for the different names.

Subsequently, the user connects the user terminal 3 to the communication network 5 to download a software package for the OS of the user terminal 3 from a download site for the OS into the user terminal 3. Thereafter, the user can play the game by accessing the game system 1 according to the present embodiment or the server of the game system 1 on the user terminal 3. Note that the server of the game system 1 according to the present embodiment is engaged with gaming processing during the game program running, without passing through any store site or the like, except for some processing such as charging processing, so that the server executes the same processing regardless of which OS is installed in each of the plurality of user terminals. However, the server may execute processing depending on the OS of the user terminal for some processing other than processing related to the drawing for contents. For example, in the charging processing, individual processing may be executed for the user to access each store site or the like having a different access destination in order to purchase a content.

The game program according to the present embodiment works on the CPU or the like, as described in relation to FIG. 2, to function as the login processing unit 10, the available environment information acquisition unit 12, the parameter determination unit 14, the parameter output unit 16, the instruction reception unit 18, the game progress unit 20, the result association unit 22, the available environment selection unit 24, the switching processing unit 26, the location information acquisition unit 28, and the information storage unit 32, which are described with reference to FIGS. 1 to 10.

The embodiment of the present disclosure described above does not limit the disclosure according to the claims. Further, it should be understood that not all combinations of the features described in the embodiment are necessarily indispensable for means for solving the problems of the disclosure. Furthermore, the technical elements of the above-described embodiment may be applied independently, or may be applied by being divided into a plurality of parts such as program parts and hardware parts.

Note that the game system according to the present embodiment can also be referred to in the following notes which should not be confused with the claims.

Note 1

A game system capable of providing a predetermined content to a user, including an available environment information acquisition unit configured to acquire available environment information indicating an available environment for a game to be executed on a user terminal used by the user; and a parameter determination unit configured to determine a parameter associated with a content used in the game on the basis of the available environment information.

Note 2

The game system further including an available environment selection unit configured to, when the game is executed on one user terminal used by one user and another user terminal used by another user, allow the one user terminal to select the available environment information of the other user terminal, where the available environment information acquisition unit acquires the available environment information of the other user terminal selected by the available environment selection unit, as available environment information for the one user terminal.

Note 3

The game system, wherein the parameter determination unit determines the parameter on the basis of use of in-game currency and/or a predetermined item.

Note 4

The game system, wherein the parameter determination unit switches the parameter set in the available environment information of the user terminal to a parameter set in the available environment information of another user terminal used by another user, according to use of the in-game virtual currency and/or the predetermined item.

Note 5

The game system, wherein the available environment is a version of game software used in the user terminal, and the game system is executable on a plurality of different versions of game software.

Note 6

The game system, wherein the parameter determination unit uses virtual currency and/or an item used in the game to determine the parameter on the basis of information related to a specific version of game software selected by the user from a plurality of different versions of game software.

What is claimed is:

1. An electronic game system configured to provide game play content to a user, the electronic game system comprising:
   a communication interface configured to acquire, from a user terminal via a network, information indicating a type of account accessed by the user to play a game executed by the user terminal; and
   processing circuitry configured to
      determine a first appearance probability of a character to be presented to the user terminal during gameplay upon receiving an indication that an input operation is received at the user terminal in a case that the information indicates that the type of account accessed by the user is a first type of account at the time of the input operation;
      determining a second appearance probability, which is different from the first appearance probability, of the character to be presented to the user terminal during gameplay upon receiving the indication that the input operation is received at the user terminal in a case that the information indicates that the type of account accessed by the user is a second type of account, which is different from the first type of account, at the time of the input operation; and
      control the communication interface to provide the character to the user terminal via the network based on the first appearance probability in a case that the information indicating the type of account accessed by the user indicates the first type of account and the second appearance probability in a case that the information indicating the type of account accessed by the user indicates the second type of account, wherein
   the first type of account accessed by the user to play the game is an account for a social network service (SNS), and
   the second type of account accessed by the user to play the game is a game service account.

2. The electronic game system of claim 1, further comprising:
   memory configured to store the first appearance probability and the second appearance probability in association with the first type of account and the second type of account, respectively, and a content ID of the character, wherein
   the processing circuitry is configured to access the memory to determine the first appearance probability, or the second appearance probability based on the received information indicating the type of account accessed by the user terminal and the content ID of the character to be presented to the user terminal during gameplay.

3. The electronic game system of claim 1, further comprising:
   memory configured to store a parameter to be used to provide electronic game play content to the user terminal via the network in association with available environment information and a content ID of the electronic game play content, wherein
   the processing circuitry is configured to use, as the parameter to be determined, a parameter calculated using the parameter stored in the memory in association with the electronic gameplay content and a coefficient determined based on the available environment information.

4. The electronic game system of claim 1, wherein
   the communication interface is configured to acquire, from the user terminal via the network, information indicating a characteristic corresponding to the user terminal as available environment information indicating the available environment for the game to be executed by the user terminal; and
   the processing circuitry is configured to determine a parameter to be used to provide electronic game play content to the user terminal via the network upon receiving the indication that the input operation is received at the user terminal based on the information indicating a characteristic corresponding to the user terminal at the time of the input operation, and
   the parameter is at least one parameter selected from the group consisting of:
      a winning probability of the electronic game play content in a case that the content is provided to the user terminal by a drawing; and
      a degree of difficulty of acquiring the electronic game play content in the game.

5. The electronic game system according to claim 3, wherein
   the available environment includes at least one piece of available environment selected from the group consisting of:
   a game program executed by the user terminal;
   a version of the game program;
   a browser; and
   the type of account accessed by the user to play the game.

6. The electronic game system of claim 1, wherein
   the processing circuitry is configured to associate a progress result of the electronic game progress with user information of the user.

7. The electronic game system of claim 1, wherein
   the electronic game system is a server including the communication interface and the processing circuitry.

8. The electronic game system of claim 1, wherein
   the electronic game system is a distributed system including a plurality of connected computing devices including the communication interface and the processing circuitry.

9. The electronic game system of claim 1, wherein
   the communication interface is configured to acquire login information of the user to log into the account; and
   the processing circuitry is configured to authenticate access to the account by the user based on the acquired login information.

10. The electronic game system of claim 1, further comprising:
    memory configured to store a parameter to be used to provide electronic game play content to the user terminal via the network in association with the first type of account and the second type of account, respectively, and a content ID of the electronic game play content, wherein
    the processing circuitry is configured to use, as the parameter to be determined, a parameter calculated using the parameter stored in the memory in association with the electronic gameplay content and a coefficient determined based on the type of account accessed by the user to play the game.

11. A method performed by an electronic game system configured to provide electronic game content to a user, the method comprising:
- acquiring, from a user terminal via a network, information indicating a type of account accessed by the user to play a game executed by the user terminal;
- determining a first appearance probability of a character to be presented to the user terminal during gameplay upon receiving an indication that an input operation is received at the user terminal in a case that the information indicates that the type of account accessed by the user is a first type of account;
- determining a second appearance probability, which is different from the first appearance probability, of the character to be presented to the user terminal during gameplay upon receiving the indication that an input operation is received at the user terminal in a case that the information indicates that the type of account accessed by the user is a second type of account; and
- providing, via the communication interface, the character to the user terminal via the network based on the first appearance probability in a case that the information indicating the type of account accessed by the user indicates the first type of account and the second appearance probability in a case that the information indicating the type of account accessed by the user indicates the second type of account, wherein
- the first type of account accessed by the user to play the game is an account for a social network service (SNS), and
- the second type of account accessed by the user to play the game is a game service account.

12. The method of claim 11, further comprising:
- acquiring, from the user terminal via the network, information indicating a version of the electronic game executed by the user terminal; and
- determining a parameter to be used to provide electronic gameplay content to the user terminal based on the version of the electronic game executed by the user terminal at the time of receiving the input operation.

13. The method of claim 11, further comprising:
- acquiring, from the user terminal via the network, information indicating a type of the user terminal; and
- determining a parameter to be used to provide electronic gameplay content to the user terminal based on the information indicating the type of the user terminal.

14. The method of claim 11, further comprising:
- acquiring, from the user terminal via the network, information identifying a browser executing the electronic game at the user terminal; and
- determining a parameter to be used to provide electronic game play content to the user terminal based on the information identifying the browser executing the electronic game at the time of the input operation.

15. The method of claim 11, further comprising:
- acquiring, from the user terminal via the network, information indicating a characteristic corresponding to the user terminal as available environment information indicating the available environment for the game to be executed by the user terminal;
- determining a parameter to be used to provide electronic game play content to the user terminal via the network upon receiving the indication that the input operation is received at the user terminal based on the information indicating a characteristic corresponding to the user terminal at the time of the input operation, wherein
- the parameter is at least one parameter selected from the group consisting of:
  - a winning probability of the electronic game play content in a case that the content is provided to the user terminal by a drawing; and
  - a degree of difficulty of acquiring the electronic game play content in the game.

16. The method of claim 15, wherein the available environment includes at least one piece of available environment selected from the group consisting of:
- a game program executed by the user terminal;
- a version of the game program;
- a browser; and
- an account used to log in to the game.

17. The method of claim 11, further comprising:
- associating a progress result of the electronic game progress with user information of the user.

18. One or more non-transitory computer-readable media comprising computer program instructions, which when executed by an electronic game play system, cause the electronic game play system to:
- acquire, from a user terminal via a network, information indicating a type of account accessed by the user to play a game executed by the user terminal;
- determine a first appearance probability of a character to be presented to the user terminal during gameplay upon receiving an indication that an input operation is received at the user terminal in a case that the information indicates that the type of account accessed by the user is a first type of account;
- determine a second appearance probability, which is different from the first appearance probability, of the character to be presented to the user terminal during gameplay upon receiving the indication that an input operation is received at the user terminal in a case that the information indicates that the type of account accessed by the user is a second type of account; and
- provide, via the communication interface, the character to the user terminal via the network based on the first appearance probability in a case that the information indicating the type of account accessed by the user indicates the first type of account and the second appearance probability in a case that the information indicating the type of account accessed by the user indicates the second type of account, wherein
- the first type of account accessed by the user to play the game is an account for a social network service (SNS), and
- the second type of account accessed by the user to play the game is a game service account.

* * * * *